United States Patent
Okuda et al.

(10) Patent No.: US 9,722,215 B2
(45) Date of Patent: Aug. 1, 2017

(54) CYLINDRICAL BATTERY

(75) Inventors: Daisuke Okuda, Kyoto (JP); Manabu Kanemoto, Kyoto (JP); Mitsuhiro Kodama, Kyoto (JP); Tadashi Kakeya, Kyoto (JP)

(73) Assignee: GS Yuasa International Ltd., Kyoto (JP)

( * ) Notice: Subject to any disclaimer, the term of this patent is extended or adjusted under 35 U.S.C. 154(b) by 306 days.

(21) Appl. No.: 14/233,501

(22) PCT Filed: Jul. 20, 2012

(86) PCT No.: PCT/JP2012/068522
§ 371 (c)(1),
(2), (4) Date: Jan. 17, 2014

(87) PCT Pub. No.: WO2013/012085
PCT Pub. Date: Jan. 24, 2013

(65) Prior Publication Data
US 2014/0193700 A1    Jul. 10, 2014

(30) Foreign Application Priority Data

Jul. 20, 2011 (JP) .................................. 2011-158542
Jul. 20, 2011 (JP) .................................. 2011-158801
Aug. 8, 2011 (JP) .................................. 2011-172697

(51) Int. Cl.
*H01M 2/20* (2006.01)
*H01M 2/26* (2006.01)
(Continued)

(52) U.S. Cl.
CPC ............. *H01M 2/02* (2013.01); *H01M 2/022* (2013.01); *H01M 2/0237* (2013.01); *H01M 2/14* (2013.01);
(Continued)

(58) Field of Classification Search
CPC ...... H01M 2/02; H01M 10/0422; H01M 2/26; H01M 10/0468; H01M 2/022;
(Continued)

(56) References Cited

U.S. PATENT DOCUMENTS 5,912,091 A    6/1999 Daio et al.
6,372,387 B1    4/2002 Kawakami et al.
(Continued)

FOREIGN PATENT DOCUMENTS

JP    59-91675    5/1984
JP    61-202876    12/1986
(Continued)

OTHER PUBLICATIONS

Extended European Search Report dated May 26, 2015 issued in the corresponding European patent application No. 12815013.3.
(Continued)

*Primary Examiner* — Helen O Conley
(74) *Attorney, Agent, or Firm* — Rankin, Hill & Clark LLP

(57) ABSTRACT

A battery includes a cylindrical battery case and an electrode group including a positive electrode, a negative electrode, and a separator. The electrode group and the battery case define a space communicated from a top to a bottom, and one of the positive electrode and the negative electrode has a current collecting terminal that extends from the electrode group in a direction away from a center axis of the battery case and is in contact with a bottom surface of the battery case.

21 Claims, 29 Drawing Sheets

(51) Int. Cl.
*H01M 2/02* (2006.01)
*H01M 10/04* (2006.01)
*H01M 2/14* (2006.01)
*H01M 2/18* (2006.01)
*H01M 10/28* (2006.01)
*H01M 10/34* (2006.01)

(52) U.S. Cl.
CPC ............... *H01M 2/18* (2013.01); *H01M 2/26* (2013.01); *H01M 10/0422* (2013.01); *H01M 10/0468* (2013.01); *H01M 10/28* (2013.01); *H01M 10/345* (2013.01)

(58) Field of Classification Search
CPC ........ H01M 2/0237; H01M 2/14; H01M 2/18; H01M 10/28; H01M 10/345
See application file for complete search history.

(56) References Cited

U.S. PATENT DOCUMENTS

| | | | |
|---|---|---|---|
| 2002/0197535 A1* | 12/2002 | Dudley | H01M 2/08 429/246 |
| 2003/0049523 A1 | 3/2003 | Saito et al. | |
| 2005/0271933 A1 | 12/2005 | Matsumoto et al. | |
| 2007/0196730 A1 | 8/2007 | Kozuki | |
| 2009/0239152 A1 | 9/2009 | Katoh | |

FOREIGN PATENT DOCUMENTS

| | | | | |
|---|---|---|---|---|
| JP | 62-66172 | 4/1987 | | |
| JP | 5-047366 | 2/1993 | | |
| JP | 5-17919 | 3/1993 | | |
| JP | 5-283107 | 10/1993 | | |
| JP | 5-299099 | 11/1993 | | |
| JP | 7-130364 | 5/1995 | | |
| JP | 8-293298 | 11/1996 | | |
| JP | 9-161837 | 6/1997 | | |
| JP | 9-199162 | 7/1997 | | |
| JP | 11-219720 | 8/1999 | | |
| JP | 2000-77078 | 3/2000 | | |
| JP | 2000-090903 | 3/2000 | | |
| JP | 2000-340210 | 12/2000 | | |
| JP | 2001-148238 | 5/2001 | | |
| JP | 2002-134096 | 5/2002 | | |
| JP | 2002-298921 | 10/2002 | | |
| JP | 2006-12801 | 1/2006 | | |
| JP | 2007-48761 | 2/2007 | | |
| JP | 2007-227137 | * | 9/2007 | ............. H01M 2/26 |
| JP | 2008-159357 | 7/2008 | | |
| JP | 2009-224296 | 10/2009 | | |
| WO | 2012/133233 | 10/2012 | | |
| WO | 2013/012084 | 1/2013 | | |

OTHER PUBLICATIONS

International Search Report dated Sep. 4, 2012 filed in PCT/JP2012/068522.

* cited by examiner

LAYERED
DIRECTION L

Fig. 10
(PLAN VIEW)
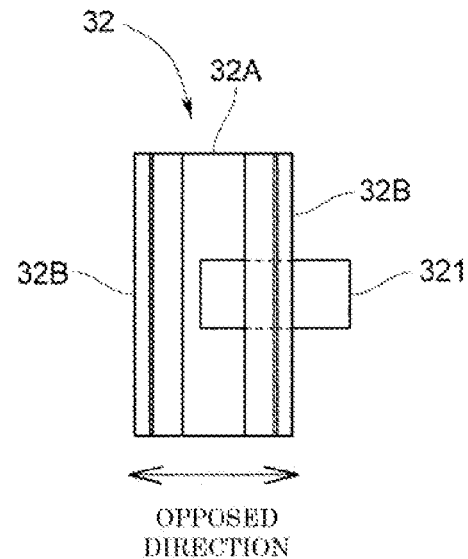
(SIDE VIEW)
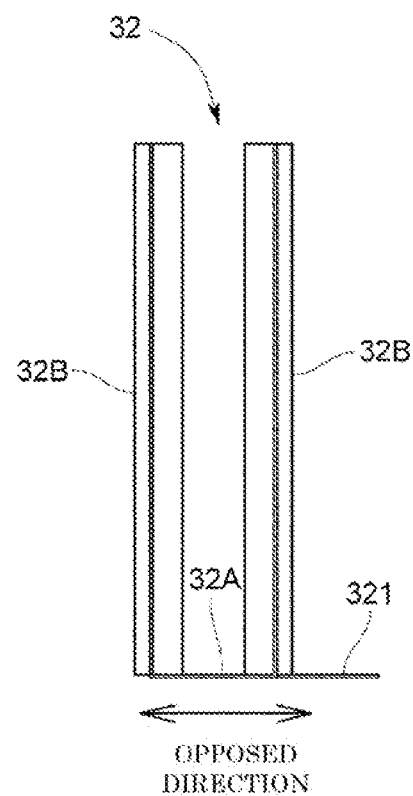

Fig. 16
(SPACER SHOWN IN FIG. 14)
(PLAN VIEW)
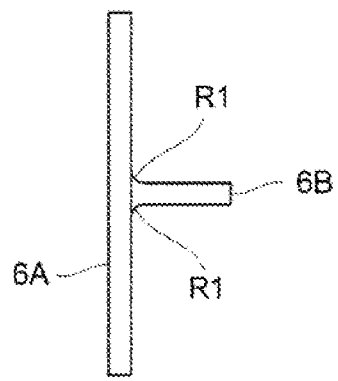
(SPACER SHOWN IN FIG. 15)
(PLAN VIEW)
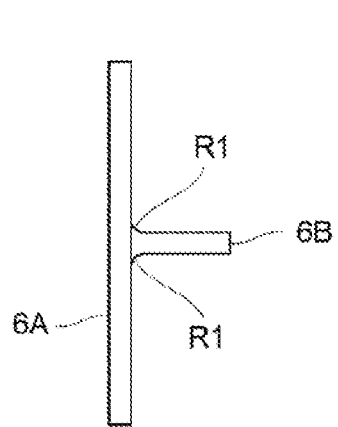
(SIDE VIEW)
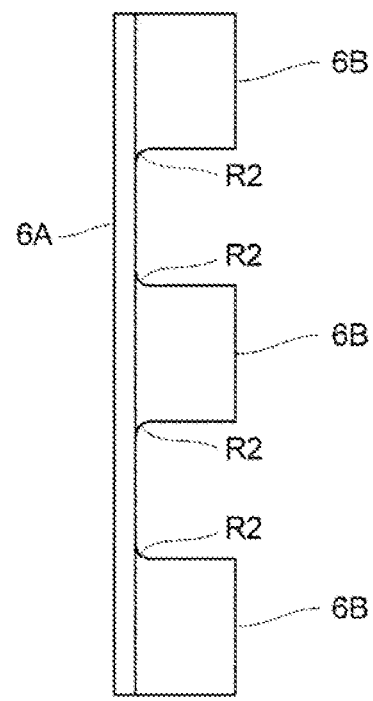

LAYERED
DIRECTION L

LAYERED
DIRECTION L

Fig. 19
(PLAN VIEW)
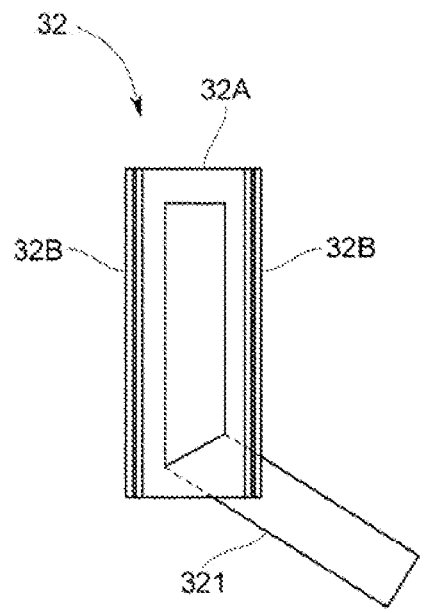
(PERSPECTIVE VIEW)
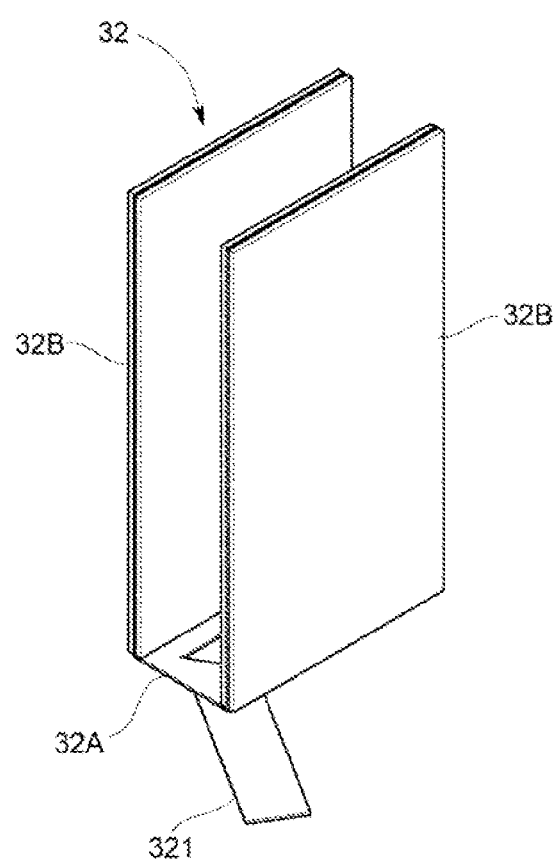

CYLINDRICAL BATTERY

TECHNICAL FIELD

The present invention relates to a cylindrical battery.

BACKGROUND ART

As disclosed in Patent Document 1, there is a conventional cylindrical battery that includes a battery case having a cylindrical shape, and an electrode group having a columnar shape and accommodated in the battery case. In the electrode group, belt-shaped positive and negative electrode plates are spirally wound with a belt-shaped separator being interposed therebetween. In order to enhance capacity, this cylindrical battery is configured such that the battery case accommodates the columnar electrode group such that the battery case is almost solid inside. The battery case is in surface contact with the negative electrode located on the outermost periphery of the cylindrical electrode group, so that current is collected from the negative electrode.

The applicant of the present invention has been developing a cylindrical battery of low capacity suitable for a purpose of use, although cylindrical batteries have been enhanced in capacity in recent years. More specifically, the applicant has been considering reduction in size of the electrode group relative to the battery case by reduction in outer diameter of the columnar electrode group accommodated in the battery case, for example.

However, when the electrode group is reduced in size relatively to the battery case, the electrode group cannot be sufficiently in contact with the battery case and it is difficult to collect current from the negative electrode.

PRIOR ART DOCUMENT

Patent Document

Patent Document 1: JP-A-2008-159357

SUMMARY OF THE INVENTION

Problems to be Solved by the Invention

The present invention has been made to solve the problems mentioned above, and an object thereof is to effectively utilize, in a battery including a cylindrical battery case and an electrode group that is smaller than the battery case and is accommodated in the battery case, the configurations of the battery case and the electrode group to achieve reliable contact between one of electrodes in the electrode group and the battery case.

Means for Solving the Problems

A cylindrical battery according to the present invention includes: a cylindrical battery case; and an electrode group including a positive electrode, a negative electrode, and a separator, wherein the electrode group and the battery case define a space communicated from a top to a bottom therebetween, and one of the positive electrode and the negative electrode has a current collecting terminal that extends from the electrode group in a direction away from a center axis of the battery case and is in contact with a bottom surface of the battery case.

In such a configuration, the electrode group and the cylindrical battery case define the space communicated from the top to the bottom therebetween, and the current collecting terminal of one of the electrodes in the electrode group extends in the direction away from the center axis of the battery case and is in contact with the bottom surface of the battery case, so that the current collecting terminal can be electrically connected more reliably to the battery case by welding or the like. Furthermore, the current collecting terminal extends outward from the electrode group. It is thus easy to provide a plurality of current collecting terminals that are in contact with the battery case at a plurality of positions. This configuration improves the current collection efficiency.

Moreover, the battery case having the cylindrical shape enhances strength against increase in internal pressure. The electrode group smaller than the battery case is located in the cylindrical battery case. This configuration increases the space in the battery case and prevents increase in internal pressure of the battery, and increases the amount of an electrolyte solution in the cylindrical battery.

Preferably, one of the positive electrode and the negative electrode is an electrode plate including a current collector and an active material applied to the current collector, the current collector has an unapplied portion that is linearly formed and has no active material applied thereto, and applied portions that are formed at both ends of the unapplied portion and have the active material applied thereto, and the current collector is bent at the unapplied portion so that the applied portions at the both ends face each other, and the unapplied portion is partially bent outward to form the current collecting terminal. The applied portions are formed at the both ends of the unapplied portion that is linearly formed, and the current collector is bent at the unapplied portion. The current collecting terminal is formed by partially bending outward the unapplied portion, so that the common current collecting terminal collects current from the two applied portions. This configuration suppresses variation in current collection efficiency and improves the current collection efficiency. The current collecting terminal is provided commonly for the two applied portions. This configuration enables reduction in number of the current collecting terminals to be welded and simplifies the welding work. Furthermore, the current collecting terminal is formed by partially bending the unapplied portion. This configuration requires neither the process of forming the current collecting terminal at the applied portion nor the process of connecting by welding the current collecting terminal to the applied portion. Moreover, the unapplied portion is linearly formed, so that the active material can be applied to the current collector so as to have a striped pattern at the time of production of the electrode plate. This improves the production efficiency of the electrode plate.

In a specific aspect for embodying the current collecting terminal extending from the unapplied portion, preferably, the unapplied portion is partially provided with a slit and an inside of the slit is bent outward to form the current collecting terminal. In this configuration, the current collecting terminal can be formed simply by providing the slit in the unapplied portion and bending the inside corresponding to the current collecting terminal. There is no need to weld the current collecting terminal to the current collector, and there is no need to consider the shape of the portion corresponding to the current collecting terminal when cutting off the current collecting terminal from a base material during production.

Preferably, the unapplied portion is partially bent outward from one of the applied portions along a bent line on a boundary or a line inside the boundary between the unapplied portion and the applied portion. The boundary between the applied portion and the unapplied portion is longer than the width of the unapplied portion (the length along the opposed direction of the applied portions). When the bent lines are located on the boundaries, it is possible to vary the width of the current collecting terminal. This configuration enables setting of the shape of the current collecting terminal in accordance with the structure outside the electrode plate, and increases as much as possible the width of the current collecting terminal, thereby improving the current collection efficiency.

Preferably, the bent current collecting terminal and the unapplied portion are located substantially in an identical plane. In this configuration, the unapplied portion can be made in contact with the bottom surface of the battery case, and the current collecting terminal can be made in contact with the bottom surface of the battery case. The electrode group can be thus stabilized in the battery case at the time of welding the current collecting terminal, which facilitates the welding work. Furthermore, the planar unapplied portion can be located so as to be in contact with the bottom surface of the battery case, so that the space in the battery case 2 can be utilized effectively.

Preferably, in at least one of the bent applied portions at the both ends, the active material applied to an outer surface of the current collector is thinner than the active material applied to an inner surface of the current collector. When the ratio between the capacity of the negative electrode and the capacity of the positive electrode (N/P ratio) is secured sufficiently, a negative active material in a portion not sandwiched between the positive electrodes is merely utilized for charging and discharging. Removal of the negative active material in this portion thus merely influences the performance of the battery. The configuration described above achieves securement of the performance of the battery and reduction in amount of the active material used. When the active material on the outer surface of the current collector is shifted as the active material on the inner surface, it is possible to increase the actual N/P ratio so as to improve the charge-discharge cycle performance. Moreover, when the active material applied to the outer surface of the current collector is thinner than the active material applied to the inner surface of the current collector, the current collecting terminal bent outward can be made longer and welding can be facilitated.

Preferably, in each of the bent applied portions at the both ends, the active material applied to the outer surface of the current collector is smaller in amount than the active material applied to the inner surface of the current collector. The active material applied to the outer surfaces of the both applied portions is reduced in amount. There is thus no need to remove the active material on one of the applied portions and both of the applied portions can have the active materials equal in amount.

The current collecting terminal is preferably welded to the bottom surface of the battery case. This configuration achieves more reliable electrical connection between the battery case and the current collecting terminal.

The electrode group is preferably accommodated such that the unapplied portion is located close to the bottom surface of the battery case.

The current collecting terminal is preferably in contact with the bottom surface and an inner peripheral surface of the battery case. This configuration achieves more reliable electrical connection because the current collecting terminal is in contact with the surfaces of the battery case having different angles.

Preferably, the cylindrical battery has a space communicated from the top to the bottom, and a welding rod used for welding the electrode group to the bottom surface or an inner peripheral surface of the battery case is inserted into the space. This configuration facilitates welding the current collecting terminal in contact with the bottom surface of the battery case.

Preferably, the cylindrical battery further includes at least one spacer fixing the electrode group in the battery case, wherein the spacer has the space communicated from the top to the bottom. In this configuration, the spacer fixing the electrode group prevents movement of the electrode group relative to the battery case. This configuration suppresses separation of the active materials in the plates and prevents deterioration in charge-discharge performance. Furthermore, the electrode group can be welded to the battery case after the electrode group is positioned and fixed in the battery case using the spacer.

Preferably, the at least one spacer includes paired spacers that are provided between an inner peripheral surface of the battery case and the paired outer side surfaces, respectively, and the paired spacers are asymmetrical with respect to the electrode group when viewed in a center axis direction of the battery case. The paired spacers are asymmetrical with each other. This configuration facilitates visual recognition of the position of the current collecting terminal of the positive electrode or the negative electrode in accordance with the shapes of the spacers. When the electrode group having a substantially rectangular parallelepiped shape is located in the cylindrical battery case, the configuration in the state where the electrode group is located in the battery case is symmetrical with respect to the center axis direction. This case causes a remarkable problem that the position of the current collecting terminal of the positive electrode plate or the negative electrode plate is hard to be visually recognized at a glance.

When the positive electrode or the negative electrode in the electrode group has one current collecting terminal, the current collecting terminal is welded at one position and it is hard to determine the welded portion in the welding work. When one of the positive electrode and the negative electrode in the electrode group has the single current collecting terminal, and the current collecting terminal is welded to an inner surface of the battery case at one position, easy visual recognition as one of the effects of the present invention is achieved more significantly.

In a specific aspect for embodying the spacers, preferably, each of the spacers includes a flat electrode contact portion having a first surface serving as a contact surface with the electrode group, and a case contact portion extending from a second surface of the electrode contact portion and being in contact with the inner peripheral surface of the battery case, and the case contact portions of the spacers extend respectively from the electrode contact portions at positions asymmetrical with respect to the electrode group. In this configuration, the electrode contact portion and the case contact portion form a concave part therebetween serving as a welding space, which enables the current collecting terminal of the positive electrode plate or the negative electrode plate to be welded to the bottom surface of the battery case. In this case, the case contact portions of the spacers extend respectively from the electrode contact portions at positions asymmetrical with respect to the electrode group. The position of the current collecting terminal can be thus easily determined at a glance, which leads to improvement in productivity.

Preferably, each of the case contact portions in the spacers extends from the electrode contact portion at a position that is away from a center in a width direction of the electrode contact surface. In this configuration, each of the case contact portions is away from the center in the width direction of the electrode contact portion. There is formed a larger space by one of the surfaces of the case contact portion and the current collecting terminal can be welded easily.

When the positive electrode or the negative electrode has the current collecting terminal that is welded to the bottom surface of the battery case, the current collecting terminal of the negative electrode is preferably located in a larger one of spaces that are defined between the side surface of the electrode group and the inner peripheral surface of the battery case and are divided by the case contact portion. In the state where the electrode group and the spacers are located in the battery case, it is possible to recognize the position of the current collecting terminal by checking the larger one of the divided spaces when viewed in the center axis direction. This configuration improves the workability of welding the current collecting terminal and improves the productivity.

Preferably, each of the spacers includes a flat electrode contact portion having a first surface serving as a contact surface in contact with an outermost surface of the electrode group in a layered direction and at least one case contact portion extending from a second surface of the electrode contact portion and being in contact with the inner peripheral surface of the battery case, and the number of the case contact portions in one of the spacers is different from the number of the case contact portions in another one of the spacers. In this configuration, the electrode contact portion and the case contact portion form a concave part therebetween serving as a welding space, which enables the current collecting terminal of the positive electrode or the negative electrode to be welded to the bottom surface of the battery case. The numbers of the case contact portions provided to the spacers are different from each other. In this configuration, the position of the current collecting terminal can be easily determined at a glance and the productivity is thus enhanced.

Preferably, the cylindrical battery further includes at least one spacer fixing the electrode group at a position decentered from a center position of the battery case. When the cylindrical battery is laid sideways, the center of gravity having larger specific gravity of the electrode group is located vertically below the center position of the battery case. This configuration increases the contact area between the electrolyte solution and the electrode group. This facilitates permeation of the electrolyte solution into the electrode group at the time of formation.

When the at least one spacer includes paired spacers that are located to sandwich the electrode group, the electrode group can be reliably fixed in the battery case. In this case, the paired spacers are preferably asymmetrical with respect to the electrode group when viewed in a center axis direction of the battery case. When the paired spacers are asymmetrical with each other, the electrode group can be fixed at a position decentered from the center position of the battery case.

The spacers preferably have unequal areas of sections perpendicular to the center axis direction. When the spacers have the unequal sectional areas, the electrode group can be also fixed at a position decentered from the center position of the battery case.

When the current collecting terminal of one of the electrodes in the electrode group is welded to the bottom surface of the battery case, it is difficult to weld the current collecting terminal to the bottom surface of the battery case due to the paired spacers being located. In this case, one of the paired spacers having the larger area of the section perpendicular to the center axis direction is preferably formed with a welding hole into which a welding rod used for welding the current collecting terminal to the battery case is inserted. When the spacer having the larger sectional area is formed with the welding hole, the welding hole can be increased in size and the welding work can be facilitated.

Advantages of the Invention

According to the present invention thus configured, in a battery including a cylindrical battery case and an electrode group that is smaller than the battery case and is accommodated in the battery case, it is possible to effectively utilize the configurations of the battery case and the electrode group to achieve reliable contact between one of electrodes in the electrode group and the battery case.

BRIEF DESCRIPTION OF THE DRAWINGS

FIG. 10 depicts a plan view and a side view of a negative electrode plate according to a modification example.

FIG. 16 depicts views according to a modification example in which a spacer has coupling portions provided with R-shaped portions.

FIG. 19 depicts a plan view and a perspective view of a negative electrode plate according to a second embodiment.

MODES FOR CARRYING OUT THE INVENTION

First Embodiment

Described below with reference to the drawings is a cylindrical battery according to a first embodiment of the present invention.

Figure 1:
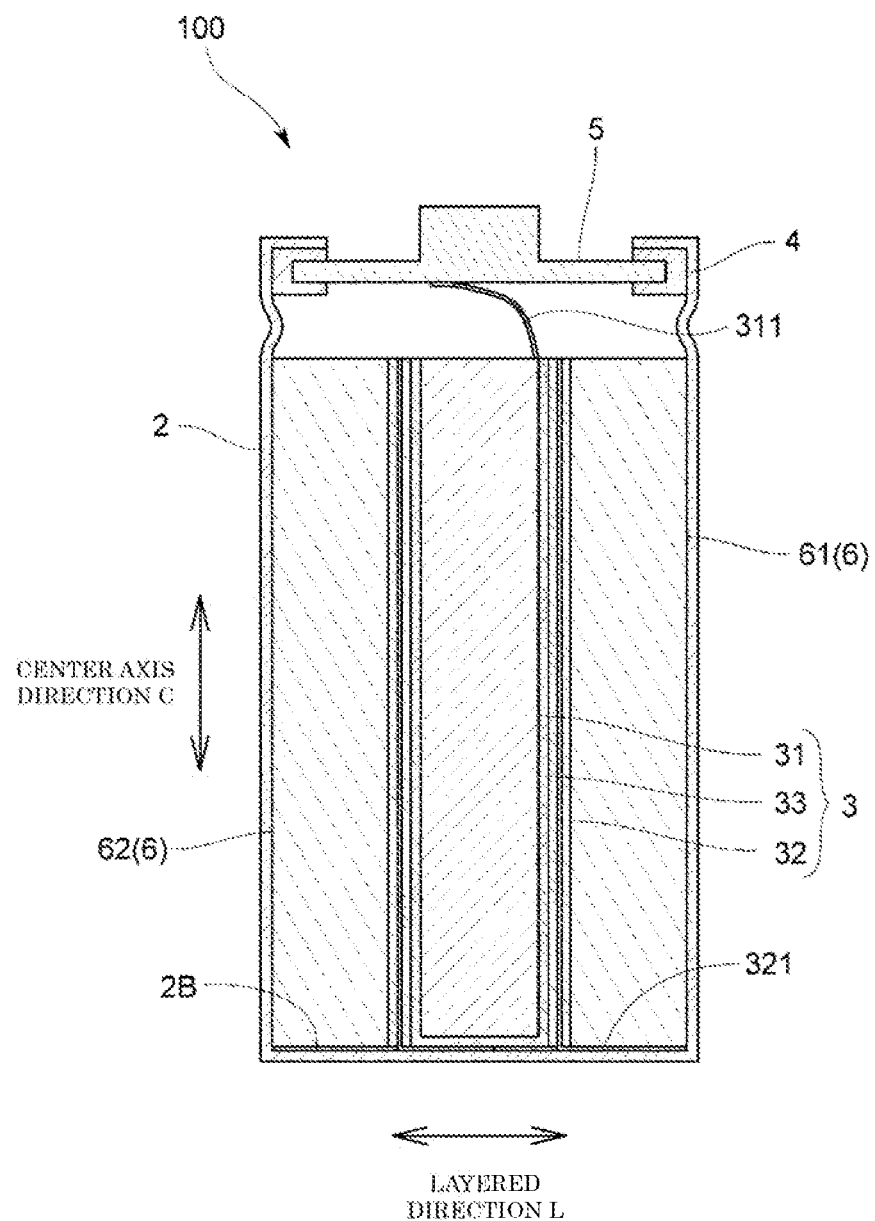
FIG. 1 depicts a longitudinal sectional view of a cylindrical battery according to a first embodiment.
Figure 2:
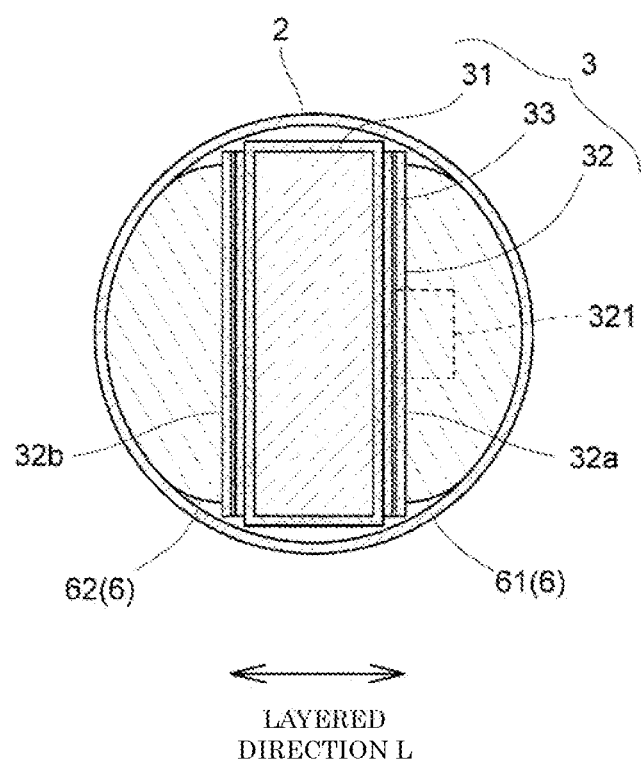
FIG. 2 depicts a transverse sectional view of the cylindrical battery according to the first embodiment.

A cylindrical battery 100 according to a first embodiment is an alkaline storage battery such as a nickel-cadmium storage battery or a nickel-metal hydride storage battery. More specifically, the cylindrical battery 100 can be of a low capacity type such as a AA battery having a capacity of not more than 1800 mAh or a AAA battery having a capacity of not more than 650 mAh. As shown in FIGS. 1 and 2, the cylindrical battery 100 includes a metal battery case 2 having a bottomed cylindrical shape and an electrode group 3 that is located in the battery case 2, has a substantially rectangular parallelepiped shape, and includes a positive electrode plate 31, a negative electrode plate 32, and a separator 33.

The battery case 2 is coated with nickel and has the bottomed cylindrical shape. As shown in FIG. 1, the battery case 2 has an upper opening that is sealed with a sealing member 5 with an insulating member 4 being interposed therebetween. The sealing member 5 has a rear surface to which a current collecting terminal 311 projecting from the upper end of the positive electrode plate 31 is connected by welding or the like directly or by way of a current collecting plate (not shown), so that the sealing member 5 functions as a positive terminal. As to be described later, in the present embodiment, the battery case 2 has a bottom surface 21B to which a current collecting terminal 321 of the negative electrode plate 32 located at the outermost position in the electrode group 3 is welded.

The electrode group 3 has the substantially rectangular parallelepiped shape, in which the positive electrode plate 31 and the negative electrode plate 32 are layered with the separator 33, which is nonwoven fabric made of polyolefin or the like, being interposed therebetween. The separator 33 is impregnated therein with an electrolyte solution of potassium hydroxide or the like.

The positive electrode plate 31 includes a positive electrode substrate made of foamed nickel and a mixture of a nickel hydroxide active material and a cobalt compound serving as a conductive material. The mixture is filled in pores of the positive electrode substrate. The positive electrode plate 31 is filled with the mixture and is then pressure molded. The positive electrode substrate is partially provided with the current collecting terminal 311. The nickel hydroxide active material can be nickel hydroxide in the case of a nickel-cadmium storage battery and can be nickel hydroxide including calcium hydroxide added thereto in the case of a nickel-metal hydride storage battery.

The negative electrode plate 32 includes a negative current collector made of a flat punched steel plate coated with nickel and a negative active material applied on the negative current collector, for example. The negative active material can be a mixture of powdered cadmium oxide and powdered metal cadmium in the case of a nickel-cadmium storage battery and can mainly include powdered hydrogen storage alloy of the $AB_5$ type (the rare earth system), the $AB_2$ type (the Laves phase), or the like, in the case of a nickel-metal hydride storage battery.

Figure 3:
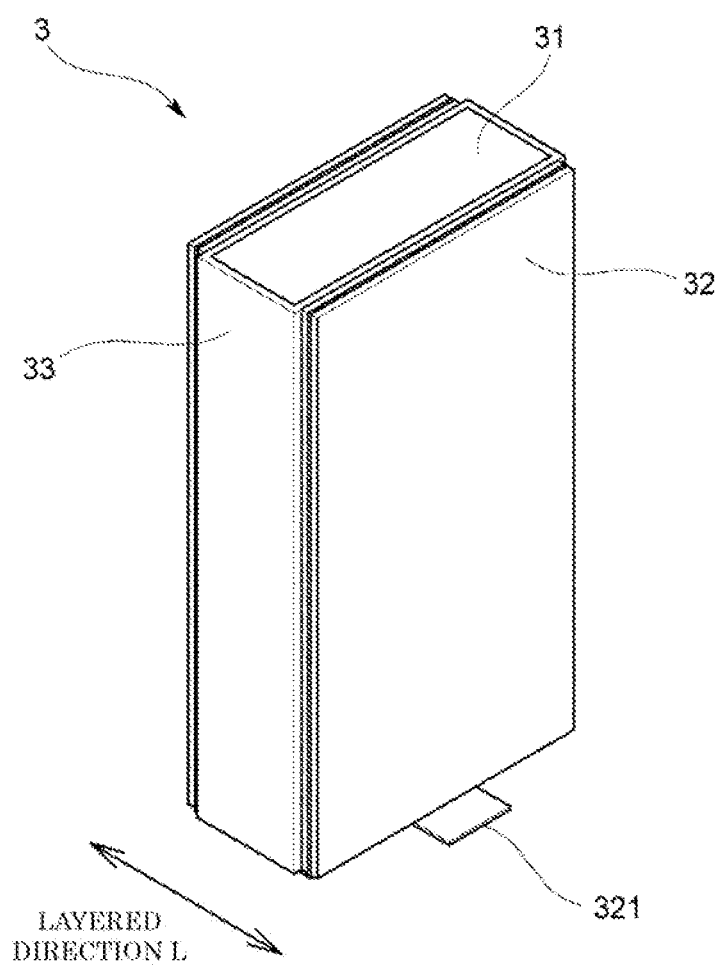
FIG. 3 depicts a perspective view of an electrode group according to the first embodiment.

As shown in FIGS. 2 and 3, in the electrode group 3 according to the present embodiment, the single positive electrode plate 31 has two opposite side surfaces, and the positive electrode plate 31, the negative electrode plate 32, and the separator are layered such that the side surfaces of the positive electrode plate 31 are sandwiched between the negative electrode plate 32 with the separator being interposed therebetween and the negative electrode plate 32 is located to configure the both outermost surfaces in a layered direction L.

As shown in FIGS. 1 and 2, the electrode group 3 according to the present embodiment is accommodated in the battery case 2 such that the layered direction L thereof is perpendicular to a center axis direction C of the battery case 2. In this state, a space communicated from a top to a bottom is defined between the outer peripheral surface of the electrode group 3 and the inner peripheral surface of the battery case 2.

Figure 4:
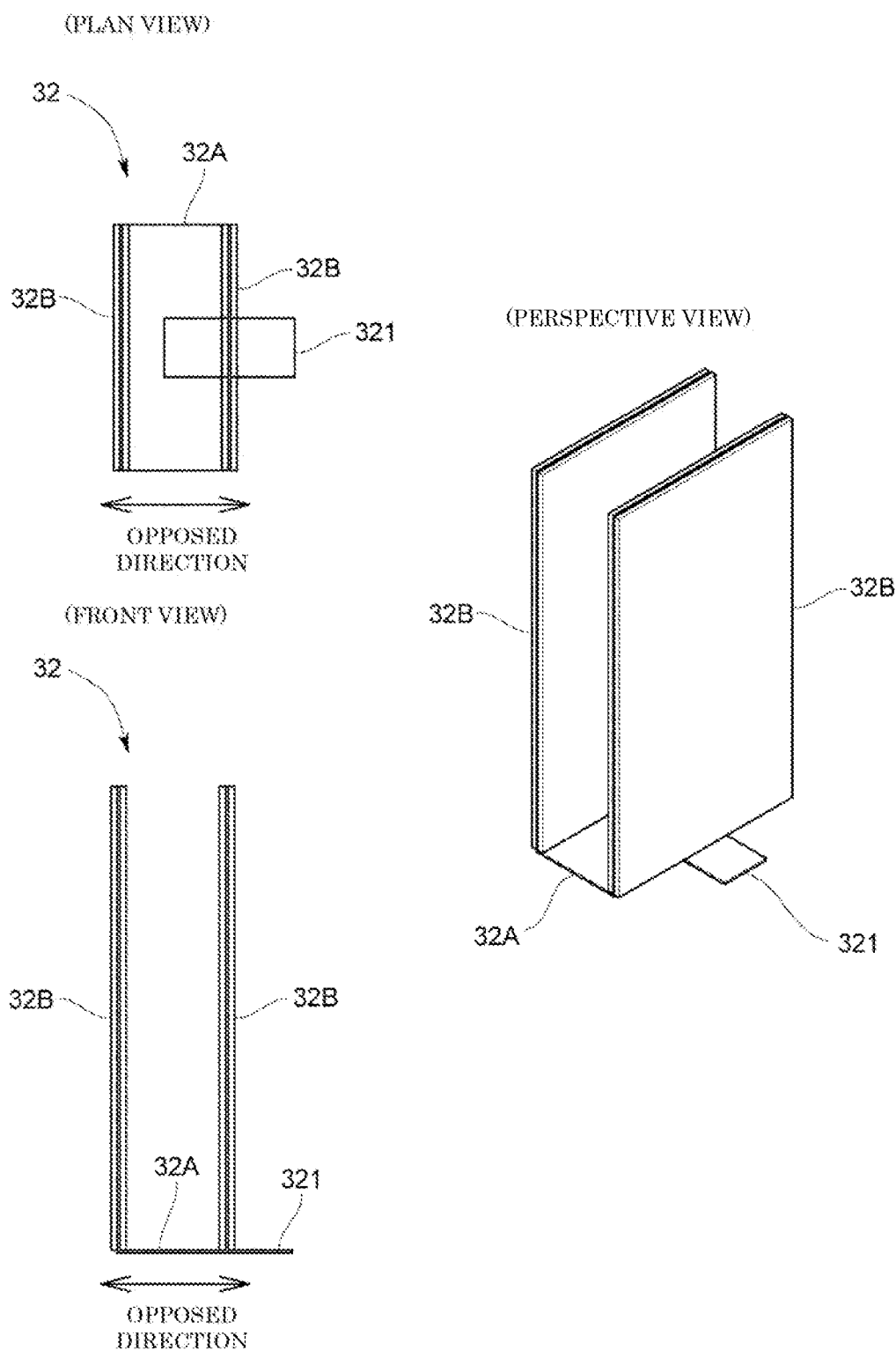
FIG. 4 depicts a plan view, a front view, and a perspective view of a negative electrode plate according to the first embodiment.
Figure 5:
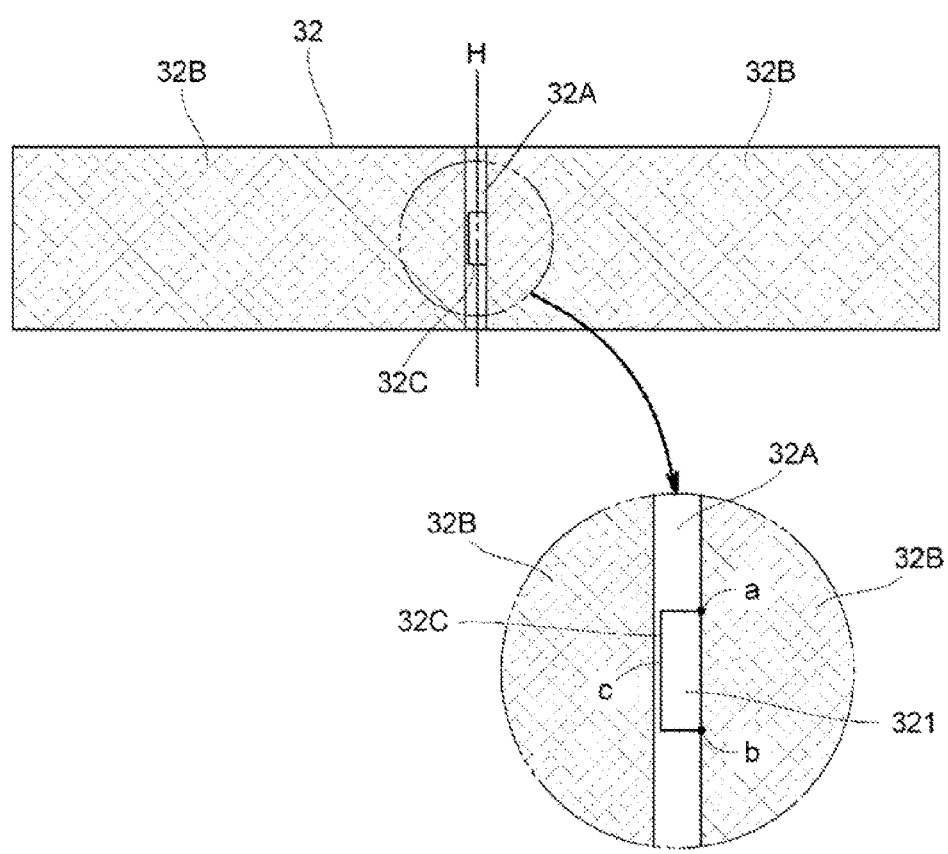
FIG. 5 depicts a developed plan view of the negative electrode plate according to the first embodiment.

As shown in FIGS. 4 and 5, the negative electrode plate 32 of the cylindrical battery 100 according to the present embodiment includes an unapplied portion 32A that is linearly formed and has no negative active material applied thereto, and applied portions 32B that are formed at the both ends of the unapplied portion 32A and have the negative active material applied thereto. The unapplied portion 32A is formed symmetrically with each other so as to include a center line H of the negative current collector. The applied portions 32B are symmetrical with respect to the unapplied portion 32A (see FIG. 5).

As shown in FIG. 4, the negative current collector of the negative electrode plate 32 is bent into a substantially U shape at the unapplied portion 32A so that the applied portions 32B at the both ends face each other. More specifically, the negative current collector is bent along bent lines on the boundaries or lines slightly inside the boundaries between the unapplied portion 32A and the applied portions 32B, so that the unapplied portion 32A and the applied portions 32B are perpendicular to each other.

Furthermore, the negative electrode plate 32 is formed with the current collecting terminal 321 that is formed by partially bending outward the unapplied portion 32A and is connected by welding to the bottom surface 2B of the battery case 2. The current collecting terminal 321 of the negative electrode plate 32 accordingly extends outward from the electrode group 3, in other words, extends from the electrode group 3 in a direction away from the center axis of the battery case 2. More specifically, the unapplied portion 32A is partially provided with a slit 32C so as to form the current collecting terminal in a desired shape, and the current collecting terminal 321 is formed by bending outward the inside of the slit 32C.

As shown in FIG. 5, the slit 32C has a slit start point a and a slit end point b that are located on the boundary between the unapplied portion 32A and one of the applied portions 32B, and a slit line c that connects the slit start point a and the slit end point b and is formed in the unapplied portion 32A. The current collecting terminal according to the present embodiment preferably has a rectangular shape, so that the slit line c has a substantially U shape in a plan view.

The current collecting terminal 321 formed inside the slit 32C is bent along a bent line on the boundary or a line slightly inside the boundary between the unapplied portion 32A and the applied portion 32B, so as to extend outward from the applied portion 32B, along the opposed direction of the applied portions 32B at the both ends. In the bent state, the planar direction of the unapplied portion 32A and the planar direction of the current collecting terminal 321 are substantially parallel to each other, and the unapplied portion 32A and the current collecting terminal 321 are located substantially within an identical plane. In the state where the battery case 2 accommodates the negative electrode plate 32, the unapplied portion 32A can be thus made in contact with the bottom surface 2B of the battery case 2 and the current collecting terminal 321 can be made in contact with the bottom surface 2B of the battery case 2. The negative electrode plate 32 can be stabilized in the battery case 2 while the current collecting terminal 321 is welded, which facilitates the welding work. Furthermore, the planar unapplied portion 32A can be located so as to be in contact with the bottom surface 2B of the battery case 2. The space in the battery case 2 can be thus utilized effectively.

Figure 6:
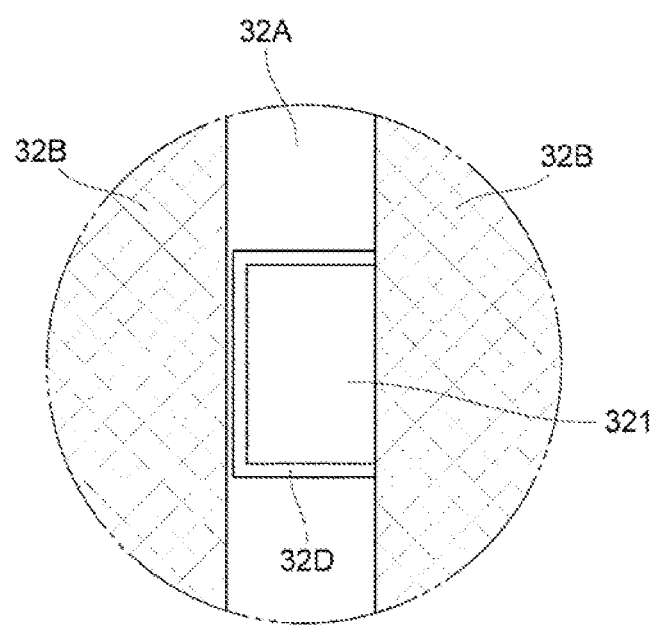
FIG. 6 depicts a partially enlarged plan view of a case where a slit is provided as a through hole.

The slit line c in FIG. 5 has the substantially U shape in the plan view. The slit line c can have substantially a U shape, a V shape, a partial circular arc shape, a W shape, an outlined T shape, or the like in a plan view. As shown in FIG. 6, the slit 32C can be replaced with a through hole 32D that has a preferred shape of the current collecting terminal. Because the through hole 32D thus formed provides a space between the unapplied portion 32A and a slit portion, it is possible to easily bend the slit portion into the shape of the current collecting terminal.

Briefly described next is a method of producing the negative electrode plate 32 thus configured.

Figure 7:
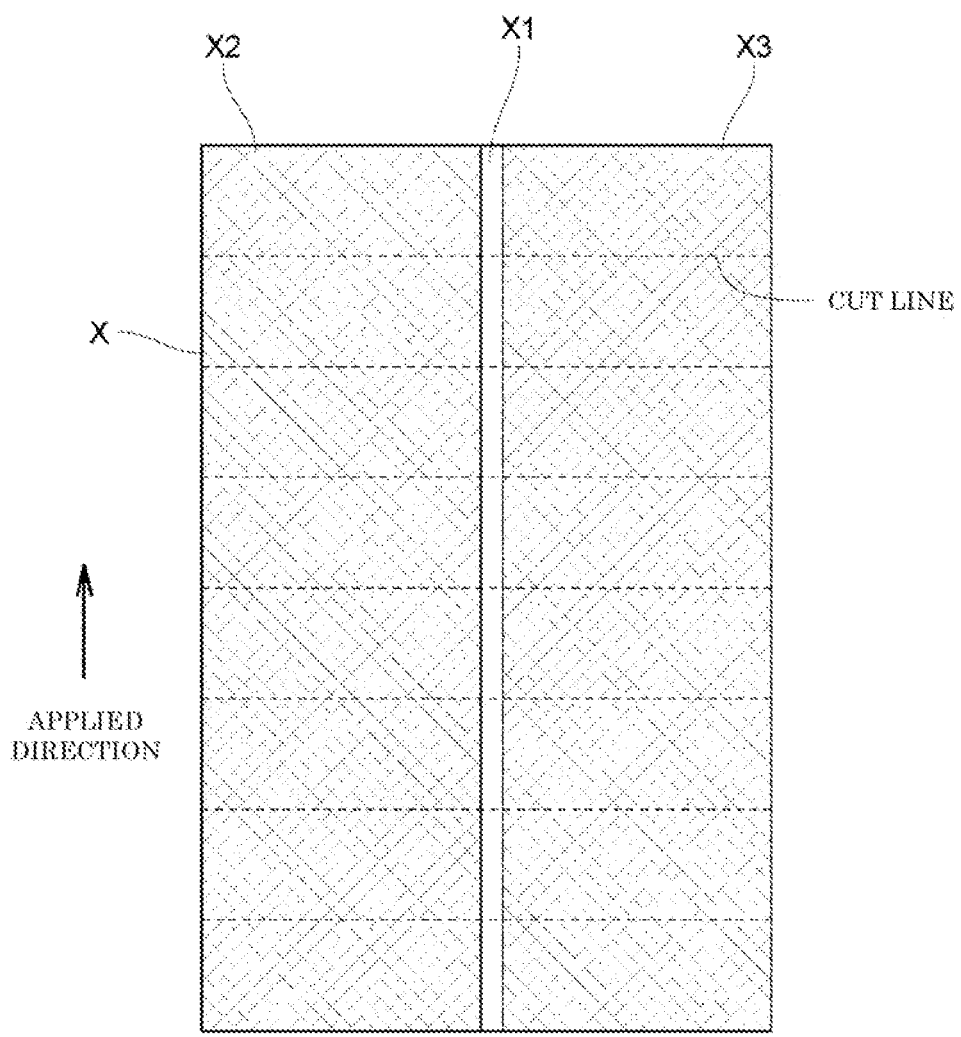
FIG. 7 depicts a view showing the step of producing the negative electrode plates according to the first embodiment.

As shown in FIG. 7, the negative active material is initially applied to applied regions X2 and X3 in a long base material X. The applied regions X2 and X3 are formed at the both ends of an unapplied region X1 that is linearly formed at the center along the longitudinal direction of the base material X. The base material X is then cut so as to have shapes the same as those of the developed negative electrode plates 32. Dotted lines in FIG. 7 indicate cut lines. The unapplied portion 32A of each of the cut negative electrode plates 32 is then provided with the slit 32C. The negative electrode plate 32 is bent into a substantially U shape and the current collecting terminal 321 is bent outward. Alternatively, the slit 32C can be formed before each of the negative electrode plates 32 is cut.

As shown in FIGS. 1 and 2, the cylindrical battery 100 according to the present embodiment includes spacers 6 for fixing the electrode group 3 in the battery case 2. The spacers 6 include paired spacers 61 and 62 that are interposed between the inner peripheral surface of the battery case 2 and the outer peripheral surface of the electrode group 3 to fix the electrode group 3 in the battery case 2. The paired spacers 61 and 62 are located in spaces between the inner peripheral surface of the battery case 2 and side surfaces of the electrode group 3, respectively, so as to sandwich the electrode group 3 in the layered direction L.

The paired spacers 61 and 62 are made of resin such as acrylic resin, polypropylene resin, or nylon resin, or are made of metal such as stainless steel, and have the same shapes.

The spacers 61 and 62 have uniform sectional shapes in the center axis direction C, respectively, and are in substantially entire contact with outer side surfaces 32a and 32b (see FIG. 2) of the negative electrode plate 32 in the layered direction L. Furthermore, the spacers 61 and 62 are in contact with the inner peripheral surface of the battery case 2 from the top to the bottom. The paired spacers 61 and 62 thus evenly press the entire electrode group 3. This improves the charge-discharge efficiency.

The spacers 61 and 62 may be in contact with the battery case 2 at portions preferably having circular arc shapes, so that the spacers 61 and 62 are made in contact in predetermined peripheral ranges of the battery case 2 and press force applied to the battery case 2 is dispersed (see FIG. 2).

Figure 8:
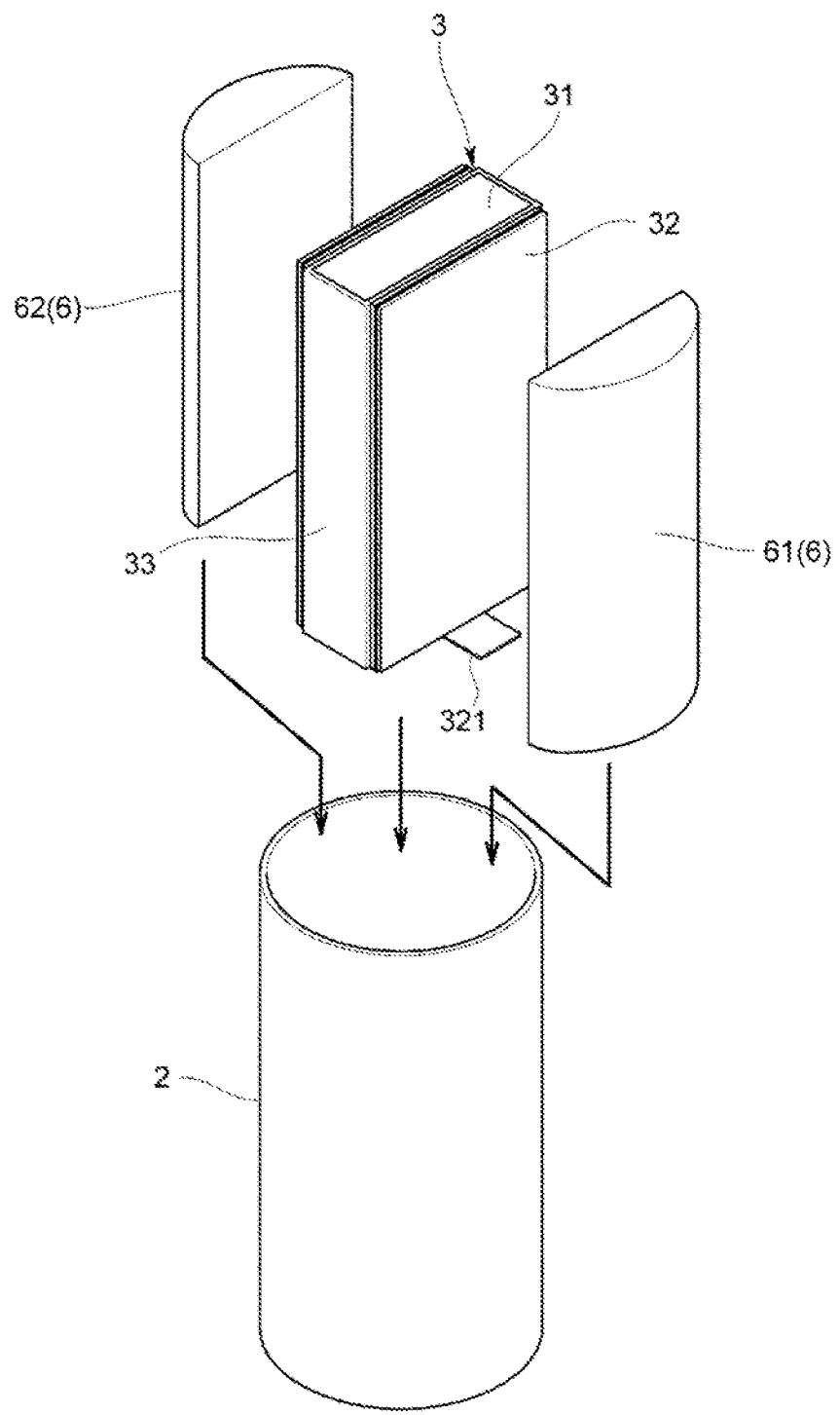
FIG. 8 depicts an exploded perspective view of the cylindrical battery according to the first embodiment.

A method of producing the cylindrical battery 100 thus configured is briefly described next with reference to FIG. 8.

The separator 33 is initially located on the two opposed side surfaces of the positive electrode plate 31 that functions as a nickel hydroxide electrode. The separator 33 according to the present embodiment has a bag shape. The bag-shaped separator 33 accommodates the positive electrode plate 31, so that the separator 33 is located on the four side surfaces of the positive electrode plate 31. The negative electrode plate 32 is then bent into the substantially U shape as described earlier, and the applied portions 32B at the both ends accommodate by sandwiching the positive electrode plate 31 and the separator 33, so that the positive electrode plate 31, the negative electrode plate 32, and the separator 33 are layered. The electrode group 3 having the layers is located in the battery case 2, and the current collecting terminal 321 of the negative electrode plate 32 is connected by welding to the bottom surface 2B of the battery case 2. The electrode group 3 is subsequently sandwiched between the paired spacers 61 and 62 in the layered direction L, and the battery case 2 is filled with the electrolyte solution. The current collecting terminal 311 of the positive electrode plate 31 is then connected to the rear surface of the sealing member 5 directly or by way of the current collecting plate (not shown). The sealing member 5 is fixed by swaging or the like to the upper opening of the battery case 2 with the insulating member 4 being interposed therebetween.

Effects of First Embodiment

In the cylindrical battery 100 according to the first embodiment thus configured, the unapplied portion 32A that is linearly formed is sandwiched between the applied portions 32B from the both sides, the negative electrode plate is bent at the unapplied portion 32A, and the unapplied portion 32A is partially bent outward to form the current collecting terminal 321. In this configuration, the common current collecting terminal 321 collects current from the two applied portions 32B, so that variation in current collection efficiency is suppressed and the current collection efficiency is improved. Furthermore, the unapplied portion 32A is linearly formed, so that the negative active material can be applied to the negative current collector so as to have a striped pattern at the time of production of the negative electrode plate 32. This improves the production efficiency of the negative electrode plate 32.

Moreover, the battery case 2 accommodates the electrode group 3 in which the positive electrode plate 31 and the negative electrode plate 32 are layered with the separator 33 being interposed therebetween. The battery thus obtained causes neither winding displacement in the electrode group 3 nor various problems related to the winding displacement. The cylindrical shape of the battery case 2 also enhances strength against increase in internal pressure. Furthermore, the spacers 61 and 62 press and fix the electrode group 3 in the battery case 2 so as to prevent movement of the electrode group 3 relative to the battery case 2. This configuration suppresses separation of the active materials in the positive electrode plate 31 and the negative electrode plate 32 so as to prevent deterioration in charge-discharge performance and rather improve the charge-discharge performance.

Modification Examples of First Embodiment

Figure 9:
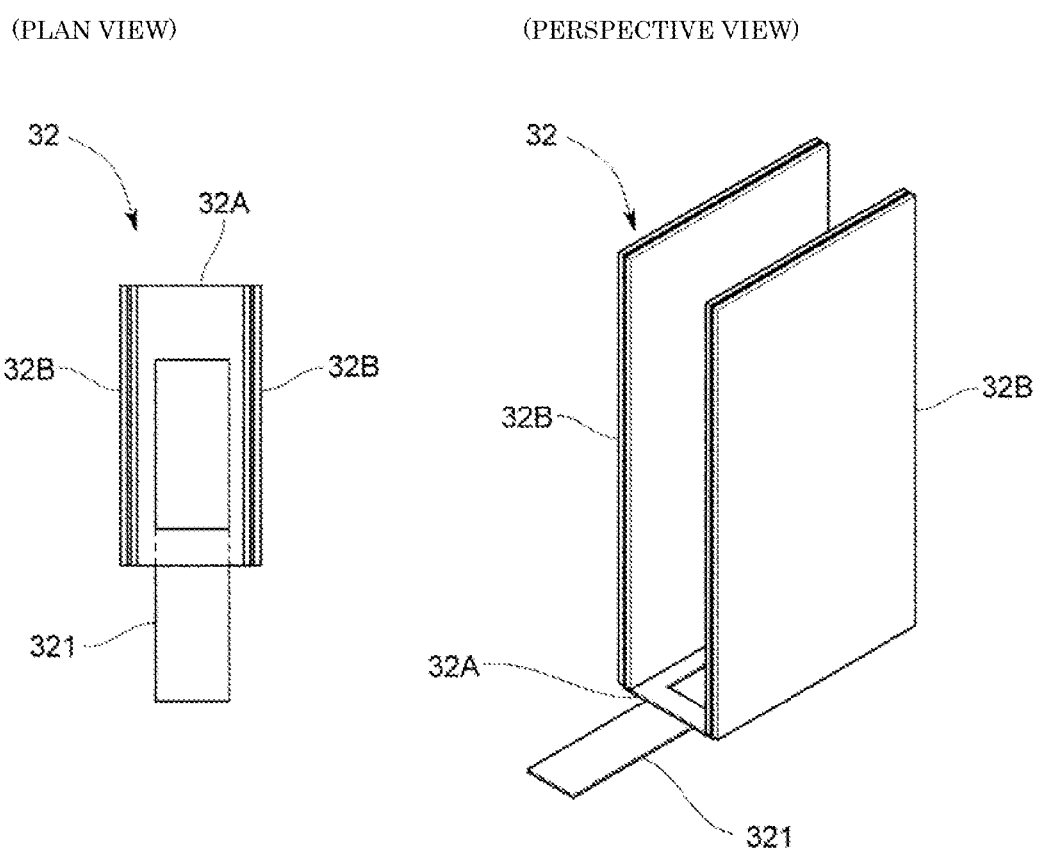
FIG. 9 depicts a plan view and a perspective view of a negative electrode plate according to a modification example.

It is noted that the present invention is not limited to the foregoing embodiment. For example, the current collecting terminal according to the first embodiment is formed by bending outward from the applied portion along the bent line on the boundary between the applied portion and the unapplied portion. The bent line is not necessarily located on the boundary between the applied portion and the unapplied portion. Alternatively, as shown in FIG. 9, the current collecting terminal 321 can extend in a direction perpendicular to the opposed direction of the applied portions 32B (parallel to the bent line). The current collecting terminal 321 thus configured can have the enhanced degree of freedom in terms of length thereof.

Moreover, as shown in FIG. 10, the negative active material applied on the outer surface of the negative current collector can be thinner than the negative active material applied on the inner surface of the negative current collector at one or each of the applied portions 32B that are located at the outer ends of the bent lines. In other words, the negative active material applied on the outer surface of the negative current collector can be smaller in amount than the negative active material applied on the inner surface of the negative current collector at one or each of the applied portions 32B that are located at the outer ends of the bent lines. FIG. 10 shows the case where the negative active material applied on the outer surface of the negative current collector is smaller in amount than the negative active material applied on the inner surface of the negative current collector at each of the applied portions that are located at the outer ends of the bent lines.

Figure 11:
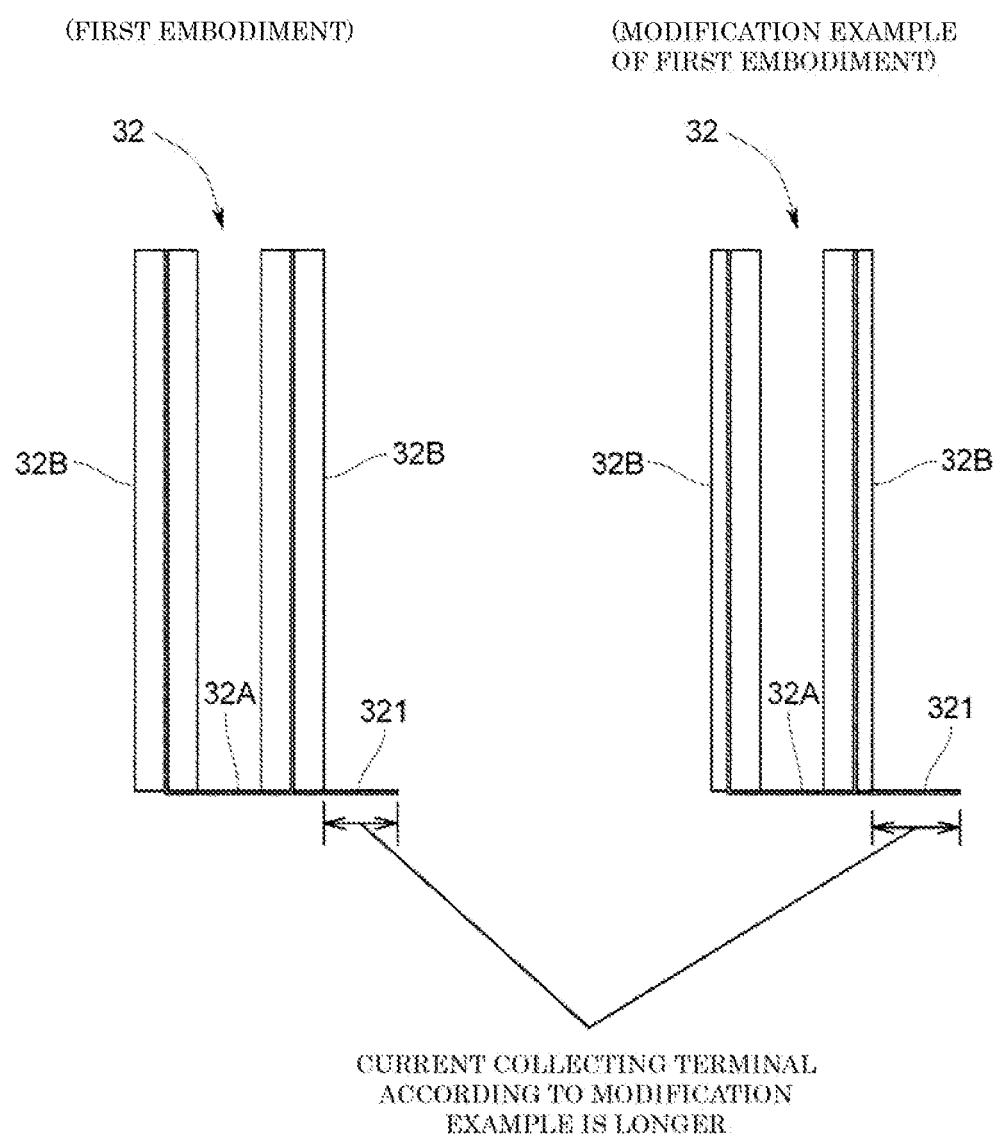
FIG. 11 depicts views for comparison between the negative electrode plate according to the first embodiment and the negative electrode plate according to the modification example.

This configuration secures the performance of the battery and reduces the amount of the active material used. When the negative active material on the outer surface of the negative current collector is shifted as the negative active material on the inner surface, it is possible to increase an actual N/P ratio so as to improve the charge-discharge cycle performance. Furthermore, as shown in FIG. 11, when the negative active material applied on the outer surface of the negative current collector is smaller in thickness (amount) than the negative active material applied on the inner surface of the negative current collector, the current collecting terminal 321 extending outward can be made longer than that according to the first embodiment and be thus welded easily.

The negative electrode plate can be bent along bent lines included in the unapplied portion that is linearly formed, so as to have a substantially V shape or a substantially U shape. Moreover, when the negative electrode facing the positive electrode is increased in area or a water repellent agent is applied on the surface of the negative electrode, oxygen gas absorbency can be improved at the terminal stage in charging.

The single current collecting terminal extends outward from the unapplied portion in the foregoing embodiment. Alternatively, there can be provided a plurality of current collecting terminals extending outward.

The positive electrode plate can include a flat positive current collector and a positive active material applied thereto, similarly to the negative electrode plate 32. Furthermore, the positive electrode plate can be configured similarly to the negative electrode plate according to the foregoing embodiment.

Figure 12:
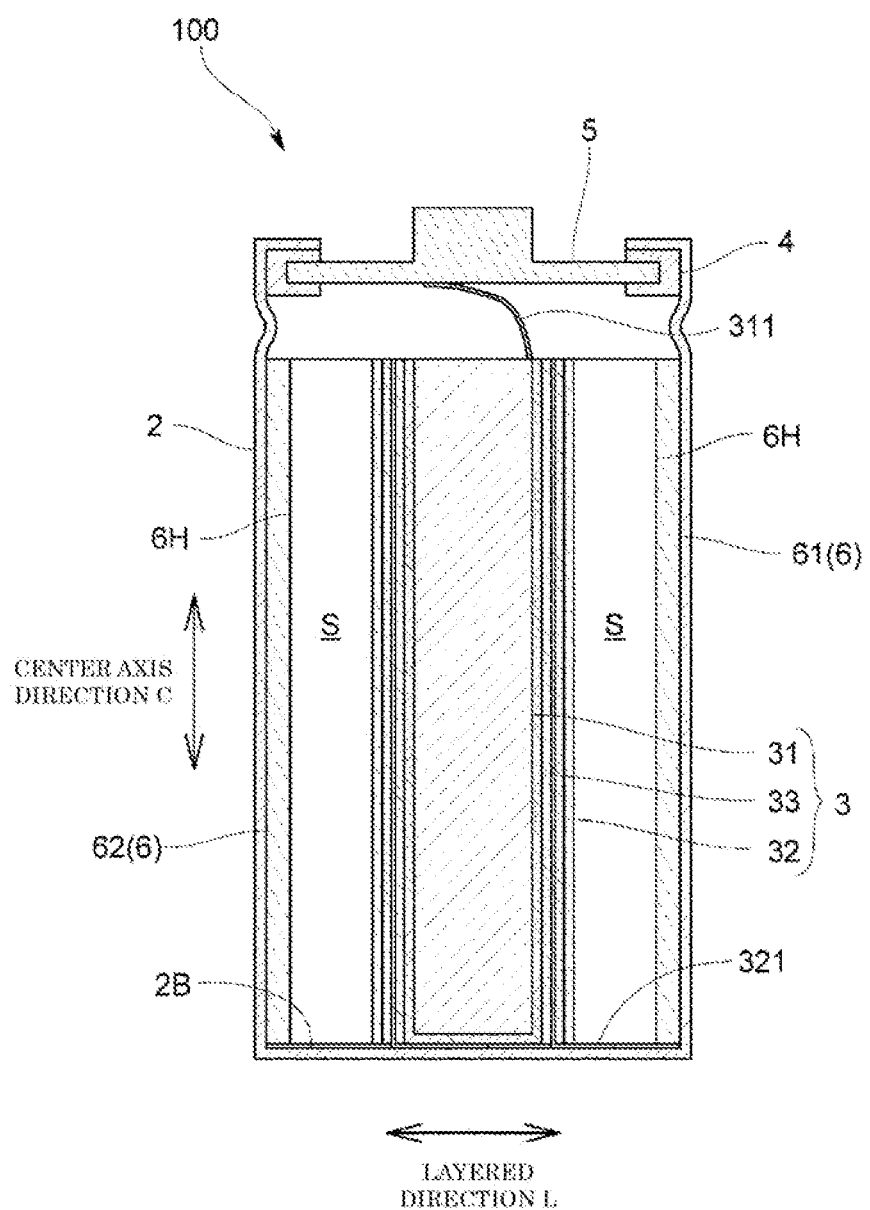
FIG. 12 depicts a longitudinal sectional view of a cylindrical battery according to a modification example of the first embodiment.
Figure 13:
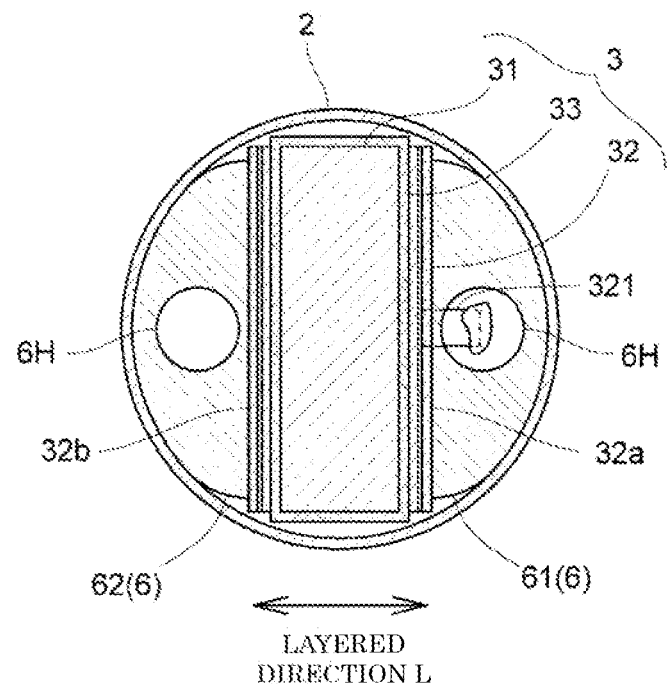
FIG. 13 depicts a transverse sectional view of the cylindrical battery according to the modification example of the first embodiment.

The spacers 61 and 62 are not limited in configuration to those according to the first embodiment. As shown in FIGS. 12 and 13, each of the spacers 61 and 62 can have a space S that is communicated from the top to the bottom (in the center axis direction C) and receives a welding rod used for welding the current collecting terminal 321 of the negative electrode plate 32 in the electrode group 3 to the bottom surface 2B of the battery case 2. Each of these spaces S is communicated from the bottom surface 2B of the battery case 2 to the upper opening of the battery case 2. More specifically, the spacers 61 and 62 each have an insertion hole 6H that is communicated from the top to the bottom and receives the welding rod. The insertion hole 6H is not limited in shape to a circular shape as long as the welding rod can be inserted thereinto for welding, and can have a polygonal shape or an elliptic shape. The insertion holes 6H are positioned so that the current collecting terminal 321 of the negative electrode plate 32 is located in the insertion hole 6H in the state where the spacers 61 and 62 fix the electrode group 3. The positions of the insertion holes 6H are thus decided in accordance with the position of the current collecting terminal 321 of the negative electrode plate 32.

In this configuration, the spacers 61 and 62 are formed with the insertion holes 6H, so that the current collecting terminal 321 of the negative electrode plate 32 can be welded after the electrode group 3 and the spacers 61 and 62 are inserted into the battery case 2. If the spacers 61 and 62 are inserted after the current collecting terminal 321 of the negative electrode plate 32 is welded, the electrode group 3 can be possibly displaced while the spacers 61 and 62 are inserted thereby to tear or damage the welded portion. This problem is not caused because welding is conducted after the spacers 61 and 62 are inserted.

Figure 14:
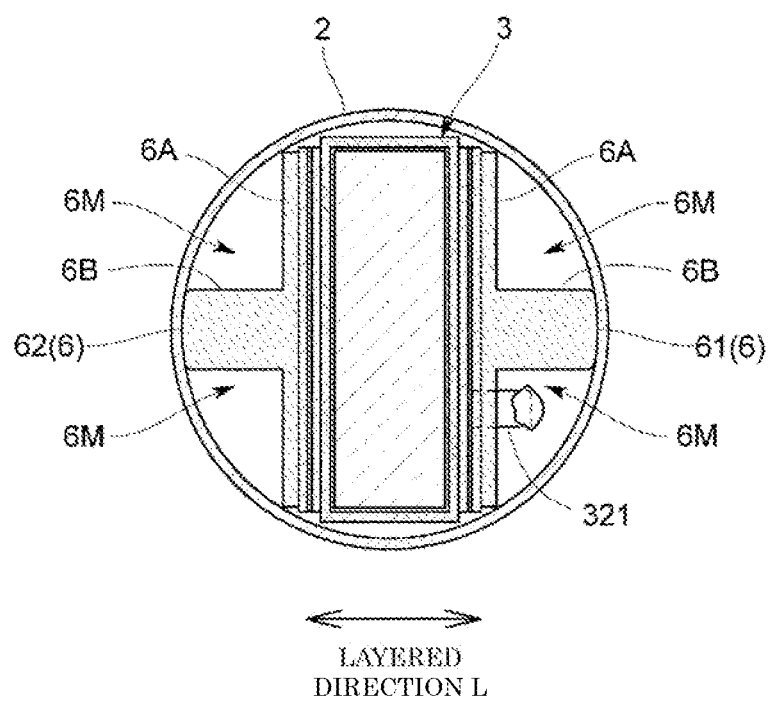
FIG. 14 depicts a transverse sectional view of an alkaline storage battery according to a modification example of the first embodiment.

The insertion holes 6H in the spacers 61 and 62 secure welding spaces. Alternatively, as shown in FIG. 14, the spacers 61 and 62 provided with no insertion holes 6H can secure welding spaces by means of outer shapes thereof. More specifically, each of the spacers 61 and 62 may have concave parts 6M on a side surface so as to have a uniform sectional shape in the center axis direction C. In FIG. 14, each of the spacers 61 and 62 has an electrode contact portion 6A in contact with the outermost surface of the electrode group 3 in the layered direction, a case contact portion 6B in contact with the inner peripheral surface of the battery case 2, and the concave parts 6M formed therebetween. Also in such a configuration, the current collecting terminal 321 of the negative electrode plate 32 can be welded to the bottom surface 2B of the battery case 2 with use of the welding space that is formed by the concave part 6M of the spacer 61 or 62 after the spacers 61 and 62 are inserted.

Figure 15:
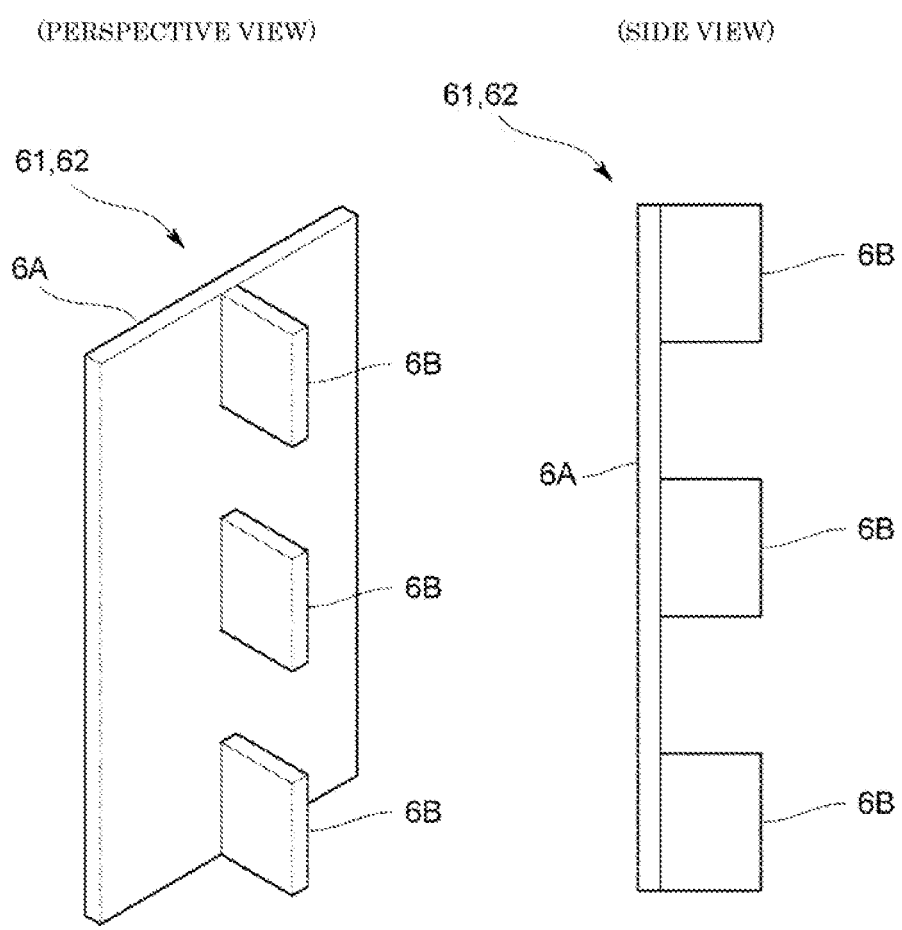
FIG. 15 depicts a perspective view and a side view of a spacer according to a modification example.

Instead of having the uniform sectional shape in the center axis direction C, each of the spacers 61 and 62 can be provided intermittently with a plurality of case contact portions 6B along the center axis direction C so as to have a substantially comb teeth shape in a side view as shown in FIG. 15. This configuration reduces the amount of the material for the spacers 61 and 62 and thus achieves reduction in cost. This configuration further facilitates electrolyte solution filling.

Furthermore, as shown in FIG. 16, the spacers 61 and 62 shown in FIG. 14 (hereinafter, referred to as first spacers) or the spacers 61 and 62 shown in FIG. 15 (hereinafter, referred to as second spacers) are preferred to be each formed with curved R-shaped portions R1 or R2 entirely or partially at corners serving as coupling portions between the electrode contact portion 6A and the case contact portions 6B. This configuration enhances mechanical strength of the coupling portions. The first spacers 61 and 62 are each formed with the R-shaped portions R1 at the two corners that are formed by the electrode contact portion 6A and the case contact portion 6B and extend along the longitudinal direction. The second spacers 61 and 62 are each formed with the R-shaped portions R2 at the two corners R1 along the longitudinal direction and at least one corner along the short-length direction, which are formed by the electrode contact portion 6A and the case contact portions 6B.

Figure 17:
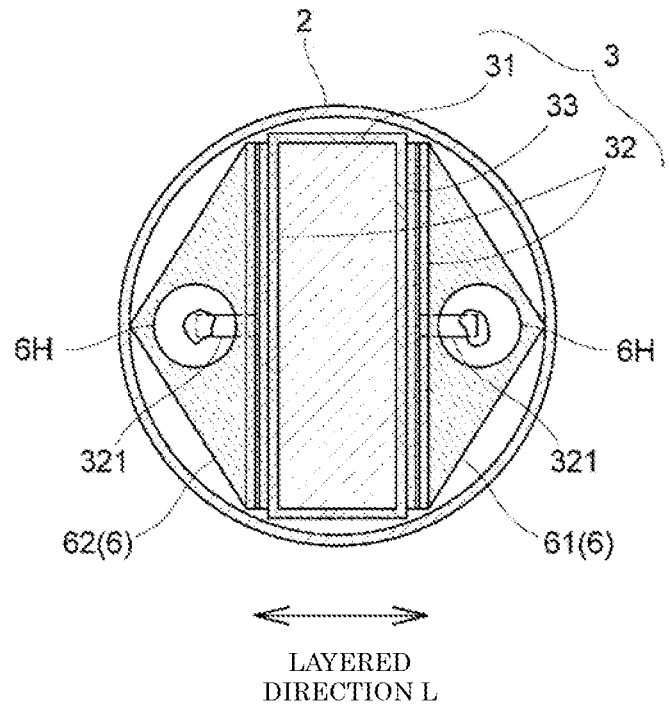
FIG. 17 depicts a transverse sectional view of an alkaline storage battery according to a modification example of the first embodiment.
Figure 18:
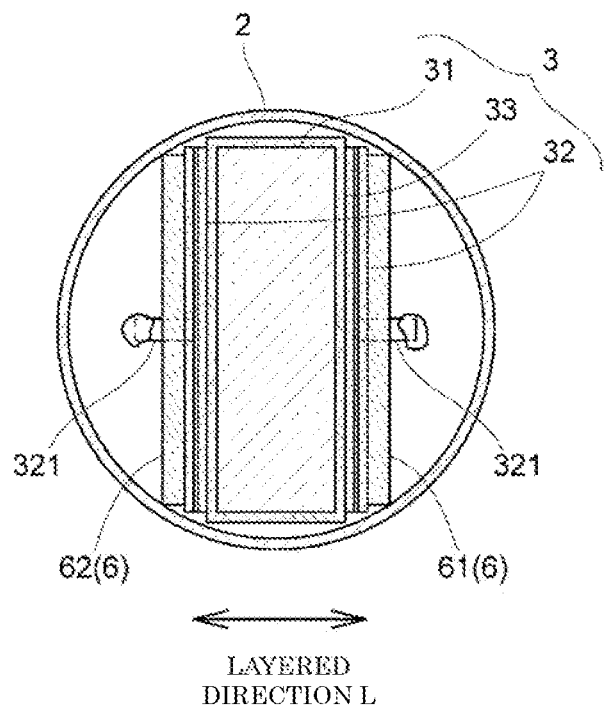
FIG. 18 depicts a transverse sectional view of an alkaline storage battery according to a modification example of the first embodiment.

Alternatively, if the battery case 2 keeps sufficient mechanical strength, each of the spacers 61 and 62 can have a prismatic shape and be in contact with the battery case 2 at an edge, as shown in FIG. 17. The battery case 2 is preferably in contact with the spacers 61 and 62 at four or more edges. The configuration, in which the battery case 2 is in contact with the spacers 61 and 62 at the four edges as shown in FIG. 18, can have larger spaces between the spacers 61 and 62 and the battery case 2 and contributes to increase in amount of the electrolyte solution and suppression of increase in internal pressure. The battery case 2 is more preferably in contact with the spacers 61 and 62 at six or more edges. When the battery case 2 is in contact with the spacers 61 and 62 at the six edges, the battery case 2 can keep a substantially perfect circle shape. If the battery case 2 is deformed into an elliptic shape, the battery case 2 may be sealed defectively. The edges herein are parallel to the center axis direction. Each of the spacers 61 and 62 shown in FIG. 17 has an isosceles triangle shape that has a bottom side in a cross section in contact with the negative electrode plate 32. When the spacers 61 and 62 are in contact with the battery case 2 at the edges, the spacers 61 and 62 and the battery case 2 can have such larger spaces therebetween and contribute to increase in amount of the electrolyte solution and suppression of increase in internal pressure.

Second Embodiment

Described next with reference to the drawings is a cylindrical battery according to a second embodiment of the present invention. It is noted that members corresponding to those of the first embodiment are denoted by the same reference signs.

The cylindrical battery 100 according to the second embodiment is different from those according to the first embodiment in the configuration of the negative electrode plate 32 and the method of electrically connecting the current collecting terminal 321 of the negative electrode plate 32 with the battery case 2.

Figure 20:
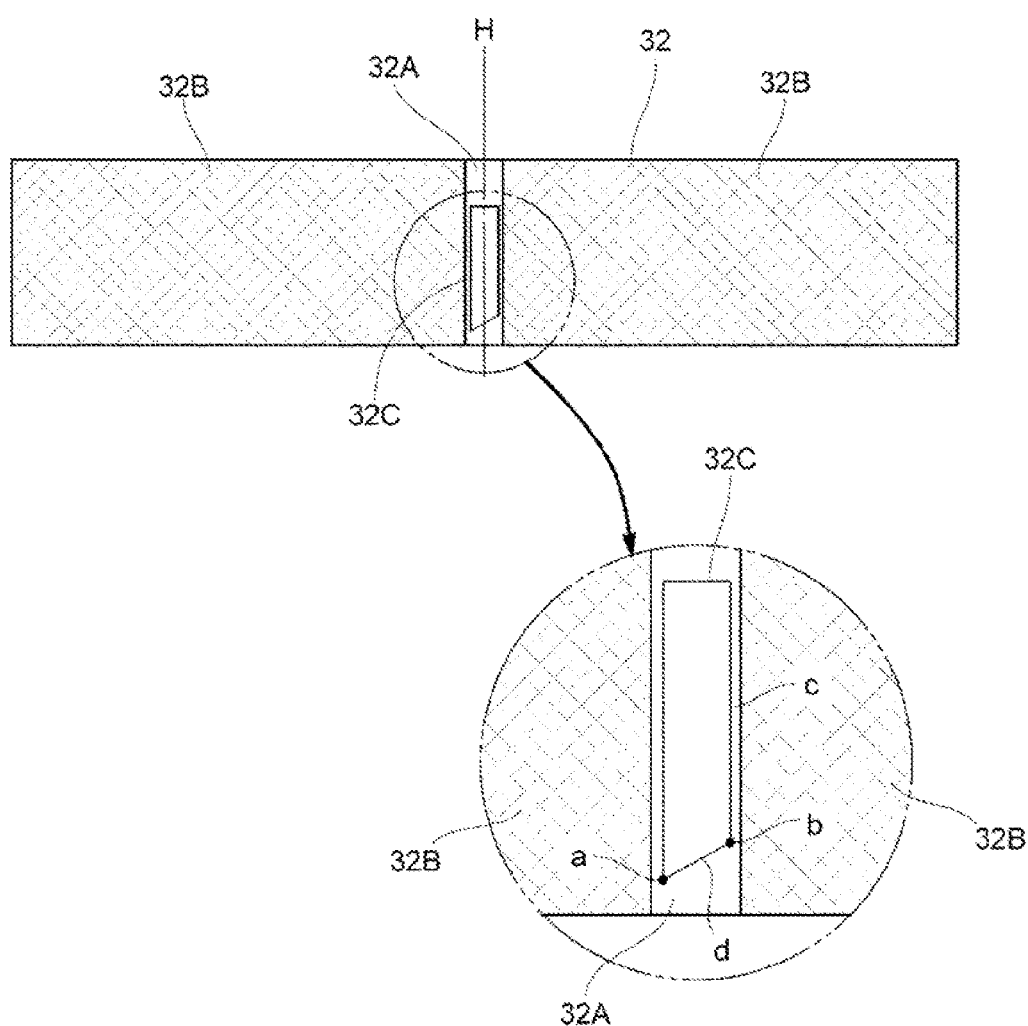
FIG. 20 depicts a developed plan view of the negative electrode plate according to the second embodiment.

More specifically, as shown in FIGS. 19 and 20, the negative electrode plate 32 includes an active material non-inclusive portion (unapplied portion) 32A that is linearly formed and includes no negative active material, and active material inclusive portions (applied portions) 32B that are formed at the both ends of the active material non-inclusive portion 32A and include the negative active material. The active material non-inclusive portion 32A is formed symmetrically with each other so as to include the center line H of the negative current collector. The active material inclusive portions 32B are symmetrical with respect to the active material non-inclusive portion 32A (see FIG. 20).

As shown in FIG. 19, the negative current collector of the negative electrode plate 32 is bent into a substantially U shape at the active material non-inclusive portion 32A such that the active material inclusive portions 32B at the both ends face each other. More specifically, the negative current collector is bent along the bent lines on the boundaries or lines slightly inside the boundaries between the active material non-inclusive portion 32A and the active material inclusive portions 32B, so that the active material non-inclusive portion 32A and the active material inclusive portions 32B are perpendicular to each other.

Furthermore, the negative electrode plate 32 is formed with the current collecting terminal 321 that is formed by partially bending outward the active material non-inclusive portion 32A and is in contact with the inner surface of the battery case 2. More specifically, as shown in FIG. 20, the active material non-inclusive portion 32A is partially formed with a slit 32C so as to form the current collecting terminal in a desired shape, and the current collecting terminal 321 is formed by bending outward the inside of the slit 32C.

The slit 32C has a slit start point a and a slit end point b that are located close to a lateral side of the active material non-inclusive portion 32A, and a slit line c that connects the slit start point a and the slit end point b and is formed in the active material non-inclusive portion 32A. The current collecting terminal according to the present embodiment preferably has a rectangular shape, so that the slit line c has a substantially U shape in a plan view.

The current collecting terminal 321 formed inside the slit 32C is bent along the slit 32C and is then bent outward so as to be slanted from the lateral side of the active material non-inclusive portion 32A. In the bent state, the planar direction of the active material non-inclusive portion 32A and the planar direction of the current collecting terminal 321 are substantially parallel to each other, and the active material non-inclusive portion 32A and the current collecting terminal 321 are located substantially within an identical plane. In the state where the battery case 2 accommodates the negative electrode plate 32, the active material non-inclusive portion 32A can be thus made in contact with the bottom surface 2B of the battery case 2 and the current collecting terminal 321 can be made in contact with the bottom surface 2B of the battery case 2. Furthermore, the planar active material non-inclusive portion 32A can be located so as to be in contact with the bottom surface 2B of the battery case 2. The space in the battery case 2 can be thus utilized effectively.

In the configuration according to the present embodiment in which the current collecting terminal 321 extends slantingly from the lateral side of the active material non-inclusive portion 32A, the distance from the lateral side to the slit start point a is different from the distance from the lateral side to the slit end point b. In FIG. 20, the distance from the lateral side to the slit start point a is made shorter than the distance from the lateral side to the slit end point b. In this configuration, a bent line d connecting the slit start point a and the slit end point b is slanted with respect to the lateral side. When the inside of the slit 32C is bent outward at the slit start point a and the slit end point b, the current collecting terminal 321 extends outward slantingly from the lateral side of the active material non-inclusive portion 32A.

The negative electrode plate 32 thus configured is produced in the following manner. As shown in FIG. 7 referred to earlier, the negative active material is initially applied to the applied regions X2 and X3 in the long base material X. The applied regions X2 and X3 are formed at the both ends of the unapplied region X1 that is linearly formed at the center along the longitudinal direction of the base material X. The base material X is then cut so as to have shapes the same as those of the developed negative electrode plates 32. The dotted lines in FIG. 7 indicate the cut lines. The unapplied portion 32A of each of the cut negative electrode plates 32 is then formed with the slit 32C. The negative electrode plate 32 is bent into the substantially U shape and the current collecting terminal 321 is bent outward. Alternatively, the slit 32C can be formed before each of the negative electrode plates 32 is cut.

Figure 21:
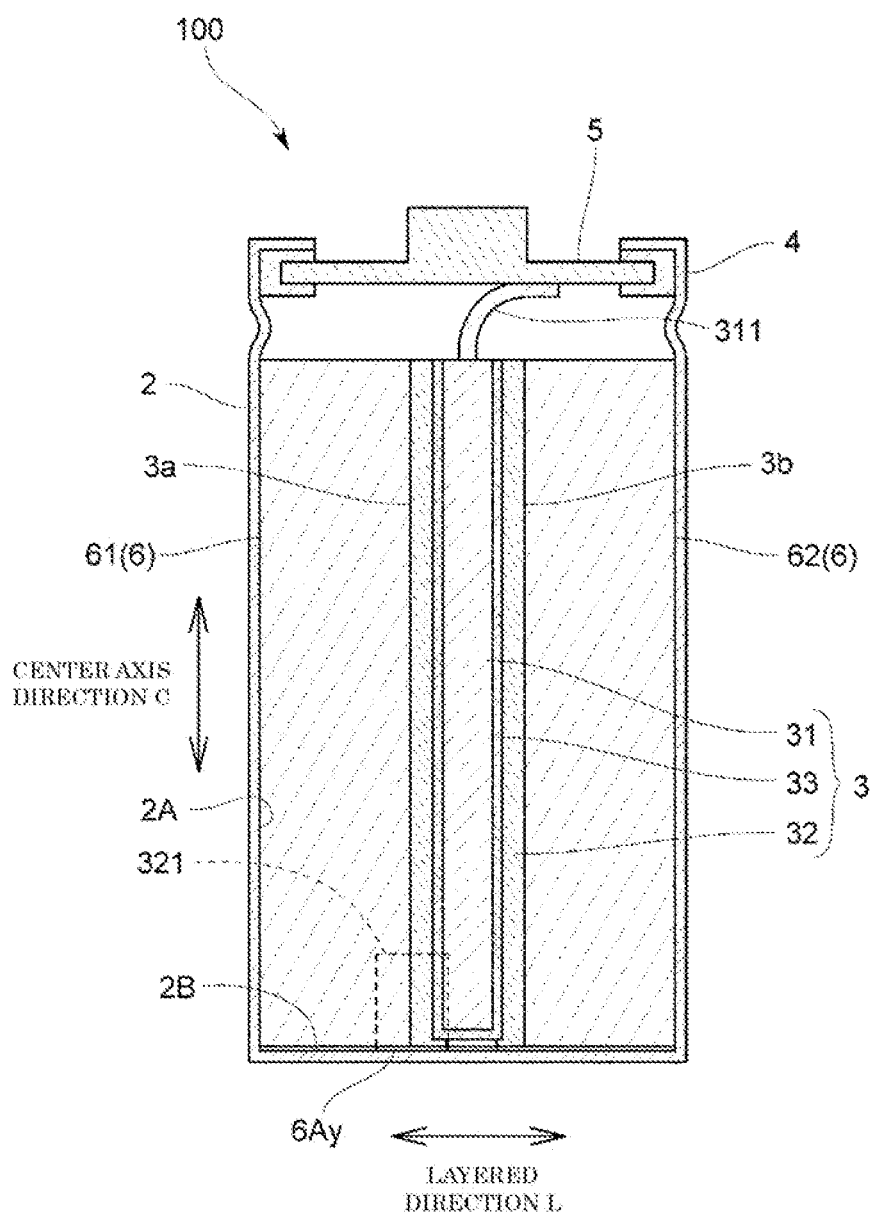
FIG. 21 depicts a longitudinal sectional view of a cylindrical battery according to the second embodiment.
Figure 22:
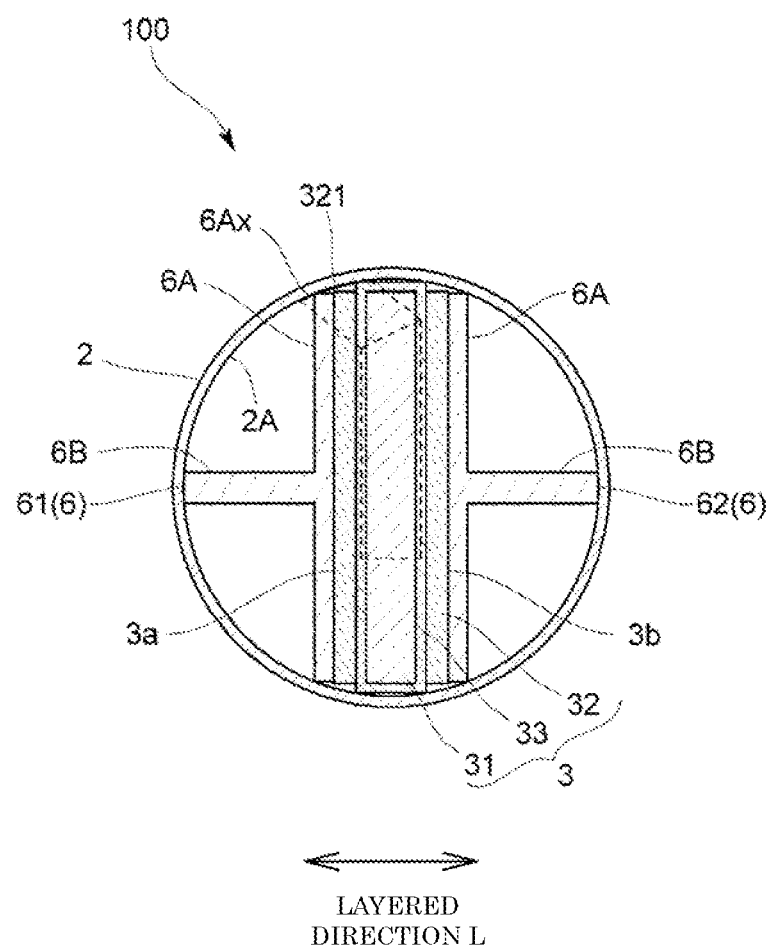
FIG. 22 depicts a transverse sectional view of the cylindrical battery according to the second embodiment.
Figure 23:
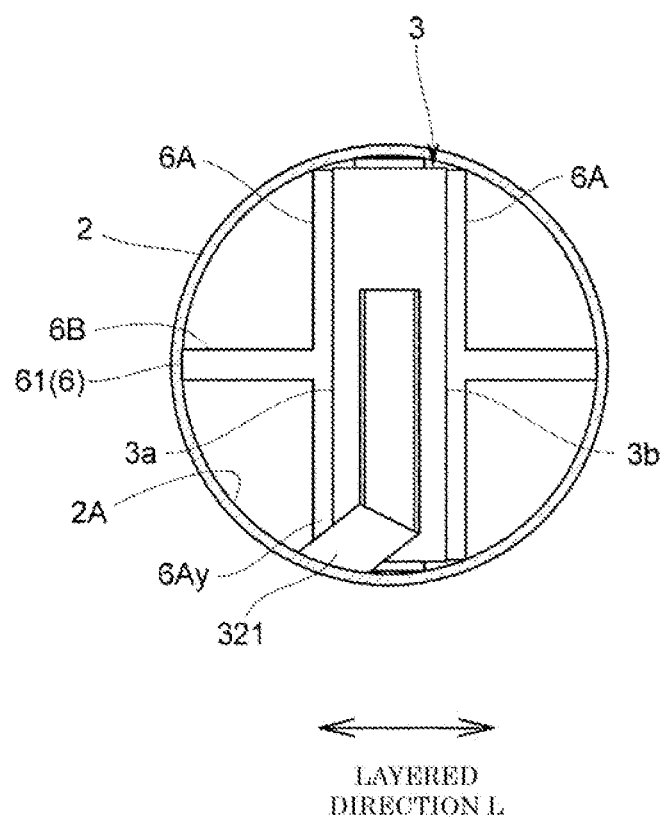
FIG. 23 depicts a bottom view of a state where a bottom wall according to the second embodiment is removed.

As shown in FIGS. 21 to 23, in the cylindrical battery 100 according to the present embodiment, the spacers 6 press the current collecting terminal 321 of the negative electrode plate 32 so as to be in contact with both the bottom surface 2B and an inner peripheral surface 2A of the battery case 2.

More specifically, the current collecting terminal 321, which is formed in the negative electrode plate 32 and extends slantingly from the lateral side of the active material non-inclusive portion 32A, is pressed by the outer side surface of the spacer 61 (an outer corner part 6Ax of the electrode contact portion 6A in FIG. 22) toward the inner peripheral surface 2A of the battery case 2 so as to be in contact therewith. The current collecting terminal 321 is also pressed by the lower surface of the spacer 61. (a lower surface 6Ay of the electrode contact portion 6A in FIGS. 21 and 23) toward the bottom surface 2B of the battery case 2 so as to be in contact therewith.

Effects of Second Embodiment

In the alkaline storage battery 100 according to the second embodiment thus configured, the current collecting terminal 321 of the negative electrode plate 32 is not welded but in contact with the bottom surface 2B and the inner peripheral surface 2A of the battery case 2 and is pressed by the spacer 61 toward the bottom surface 2B and the inner peripheral surface 2A. This configuration does not require the work of welding the current collecting terminal 321 to the battery case 2, and the current collecting terminal 321 and the battery case 2 can be made in contact with each other by simply inserting the spacers 61 and 62 into the battery case 2, so that the production steps are reduced in number. Furthermore, the spacer 61 presses the current collecting terminal 321 toward the battery case 2, so that electrical connection between the current collecting terminal 321 and the battery case 2 can be kept well and resistance between the current collecting terminal 321 and the battery case 2 can be reduced as much as possible.

Modification Examples of Second Embodiment

It is noted that the present invention is not limited to the second embodiment. The current collecting terminal 321 and the negative electrode plate 32 are formed integrally with each other in the second embodiment. Alternatively, the current collecting terminal prepared as a separate component can be welded to the negative electrode plate 32 so as to be integral with each other, for example.

Third Embodiment

Described next with reference to the drawings is a cylindrical battery according to a third embodiment of the present invention. It is noted that members corresponding to those of the foregoing embodiments are denoted by the same reference signs.

The cylindrical battery 100 according to the third embodiment is different from those according to the foregoing embodiments in the configuration of the electrode group 3 and the configurations of the spacers 6 (the first spacer 61 and the second spacer 62).

Figure 24:
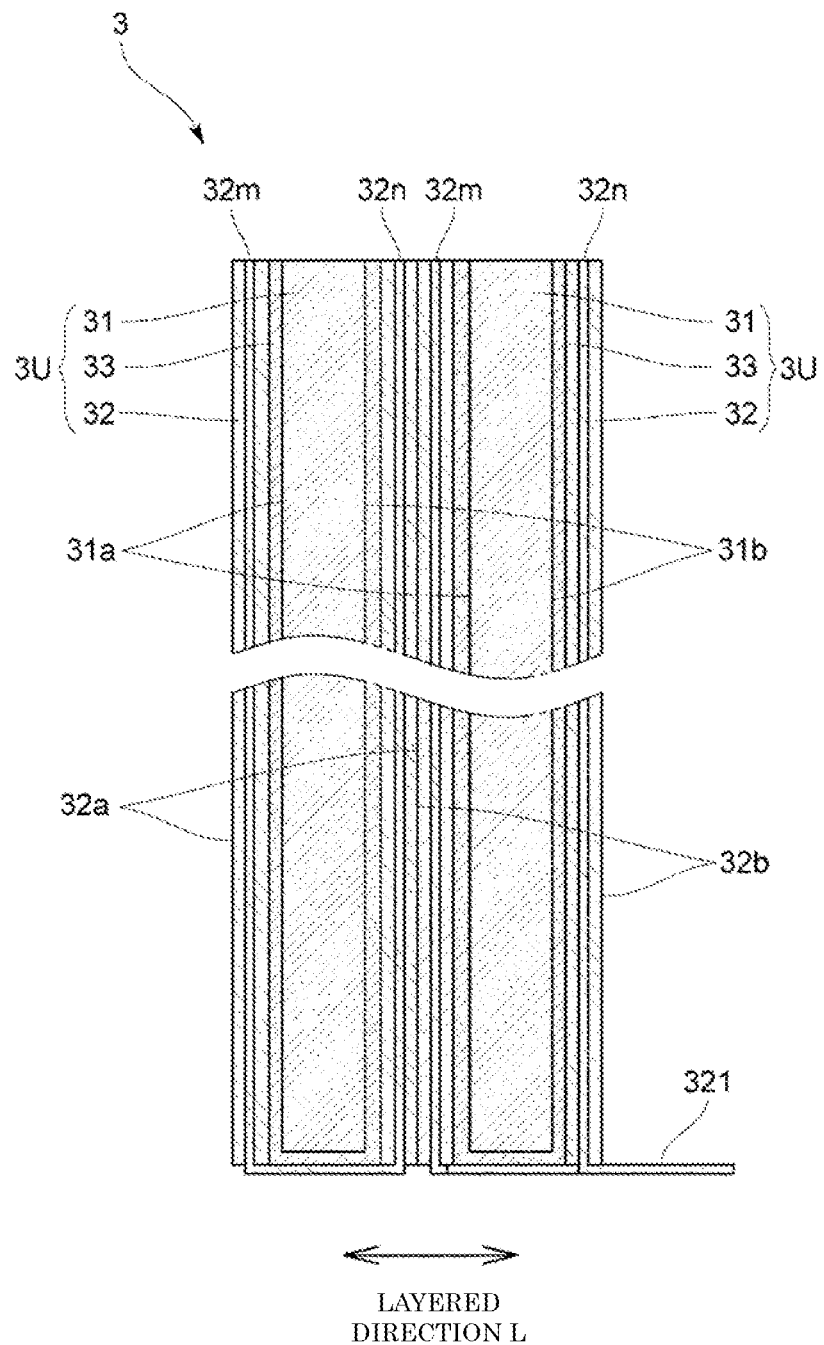
FIG. 24 depicts a longitudinal sectional view of plate units according to a third embodiment.

More specifically, as particularly shown in FIG. 24, the electrode group 3 includes one or a plurality of plate units 3U in each of which the single positive electrode plate 31, the negative electrode plate 32, and the separator 33 are layered such that the negative electrode plate 32 sandwiches the two opposite side surfaces 31a and 31b of the positive electrode plate 31 with the separator 33 being interposed therebetween. More specifically, the negative electrode plate 32 is bent into the substantially U shape as a U-shaped plate. The negative electrode plate 32 is bent into the substantially U shape or the like so that flat plate parts 32m and 32n facing each other sandwich the positive electrode plate 31. In the electrode group 3 including the plate units 3U thus layered, the negative electrode plate 32 is located to configure the both outermost surfaces in the layered direction L. The adjacent plate units 3U are electrically conducted with each other because the flat plate parts 32m and 32n of the negative electrode plates 32 are in surface contact with each other. In this configuration, by welding the current collecting terminal 321 led out of one of the plate units 3U, the negative electrode plate 32 of the other plate unit 3U is electrically connected to the bottom surface 2B of the battery case 2. The current collecting terminal 321 formed on the negative electrode plate 32 of the one of the plate units 3U extends outward in the layered direction from the center in the width direction of the negative electrode plate 32 (see FIG. 25), and is formed by partially bending outward a bottom surface part (the coupling portion between the flat plate part 32m and the flat plate part 32n) of the negative electrode plate 32 having the substantially U shape. More specifically, the bottom surface part is partially provided with a slit so as to form the current collecting terminal in a desired shape, and the current collecting terminal 321 is formed by bending outward the inside of the slit.

The first spacer 61 has an electrode contact portion 61A and a case contact portion 61B. The electrode contact portion 61A has a flat plate shape and a first surface 61a serving as a contact surface in substantially entire contact with the outermost surface (more particularly, the outer side surface 32a of the negative electrode plate 32) of the electrode group 3 in the layered direction L. The case contact portion 61B extends from a second surface 61b of the electrode contact portion 61A and is in contact with the inner peripheral surface 2A of the battery case 2. The first spacer 61 has a substantially T uniform sectional shape when viewed in the center axis direction C. The case contact portion 61B is in contact with the inner peripheral surface 2A of the battery case 2 from the top to the bottom.

The second spacer 62 has an electrode contact portion 62A and a case contact portion 62B. The electrode contact portion 62A has a flat plate shape and a first surface 62a serving as a contact surface in substantially entire contact with the outermost surface (more particularly, the outer side surface 32b of the negative electrode plate 32) of the electrode group 3 in the layered direction L. The case contact portion 62B extends from a second surface 62b of the electrode contact portion 62A and is in contact with the inner peripheral surface 2A of the battery case 2. The second spacer 62 has a substantially T uniform sectional shape when viewed in the center axis direction C. The case contact portion 62B is in contact with the inner peripheral surface 2A of the battery case 2 from the top to the bottom. The case contact portions 61B and 62B of the first and second spacers 61 and 62 are in contact with the inner peripheral surface 2A from the top to the bottom, so that the paired spacers 61 and 62 evenly press the entire electrode group 3. This configuration improves the charge-discharge efficiency.

Figure 25:
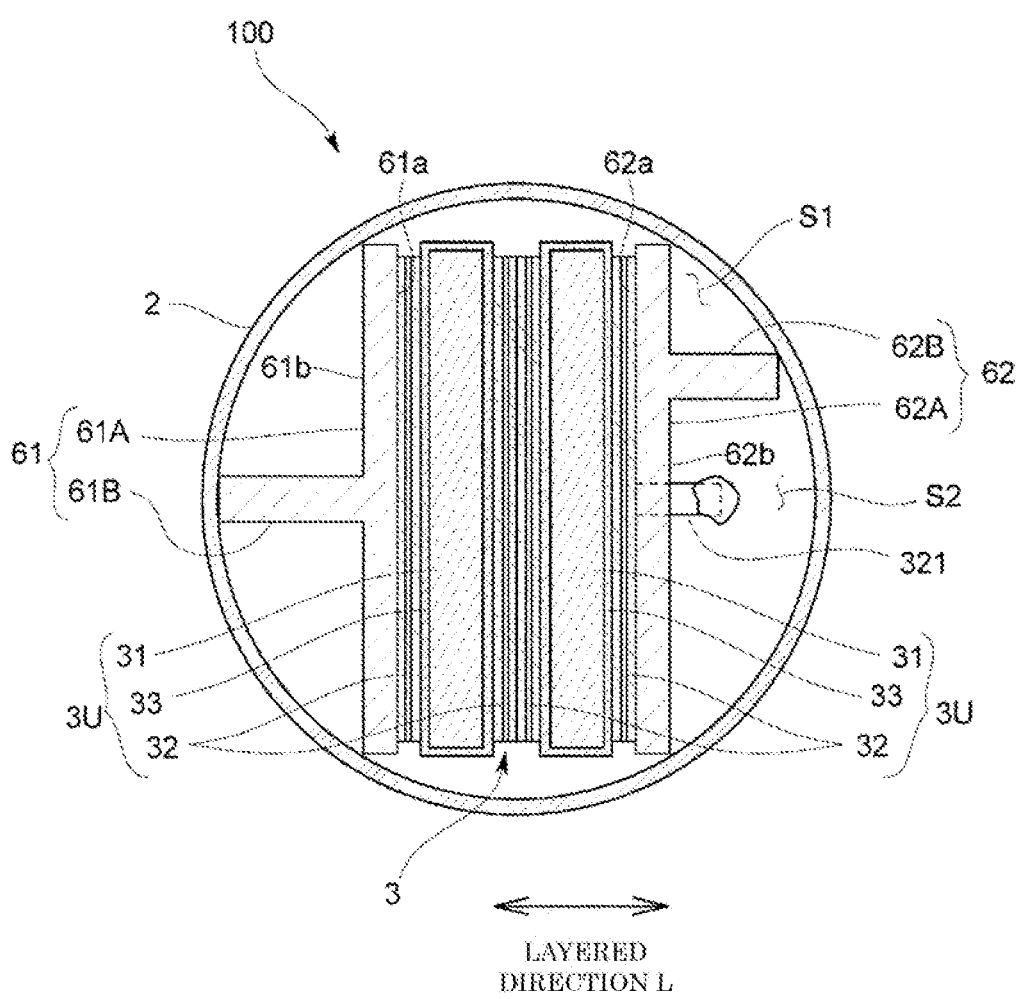
FIG. 25 depicts a transverse sectional view of a cylindrical battery according to the third embodiment.

As shown in FIG. 25, the first and second spacers 61 and 62 located in the battery case 2 are asymmetrical with respect to the electrode group 3 when viewed in the center axis direction C of the battery case 2.

More specifically, the position where the case contact portion 61B extends from the electrode contact portion 61A in the first spacer 61 and the position where the case contact portion 62B extends from the electrode contact portion 62A in the second spacer 62 are asymmetrical with respect to the electrode group 3. In the present embodiment, the case contact portion 61B of the first spacer 61 extends from the center of the electrode contact portion 61A, and the first spacer 61 is thus symmetrical with respect to the case contact portion 61B. In contrast, the case contact portion 62B of the second spacer 62 extends from a portion shifted from the center toward an end of the electrode contact portion 62A, and the second spacer 62 is thus asymmetrical with respect to the case contact portion 62B. The case contact portions 61B and 62B of the spacers 61 and 62 extend from the different positions as described above, and the case contact portion 61B of the first spacer 61 is longer than the case contact portion 62B of the second spacer 62.

The current collecting terminal 321 of one of the negative electrode plates 32 in the electrode group 3 extends on the bottom surface 2B of the battery case 2 toward the second spacer 62. In the state where the electrode group 3, the first spacer 61, and the second spacer 62 are located in the battery case 2, the position of the current collecting terminal 321 can be determined easily by checking the second spacer 62, the case contact portion 62B of which is shifted from the center. In other words, it is possible to easily determine the position of the current collecting terminal 321 by deciding toward which one of the first spacer 61 and the second spacer 62 the current collecting terminal 321 extends.

The second spacer 62 and the inner peripheral surface 2A of the battery case 2 define a space therebetween, which is divided by the case contact portion 62B into two spaces S1 and S2. The current collecting terminal 321 is located in the space S2 that is larger in size. The current collecting terminal 321 of the negative electrode plate 32 is located in the larger space S2. It is thus possible to easily determine the position of the current collecting terminal 321 by checking the larger space S2. It is also possible to improve the workability for welding the current collecting terminal 321 to the bottom surface 2B of the battery case 2.

Effects of Third Embodiment

In the alkaline storage battery 100 according to the third embodiment thus configured, the paired spacers 61 and 62 are asymmetrical with respect to the electrode group 3 when viewed in the center axis direction C of the battery case 2. In the state where the electrode group 3 and the paired spacers 61 and 62 are located in the battery case 2, it is possible to easily determine the position (welded portion) of the current collecting terminal 321 to be welded to the battery case 2 in accordance with the asymmetrical spacers 61 and 62. This configuration improves the workability of the welding work and the productivity of the battery 100.

Modification Examples of Third Embodiment

Figure 26:
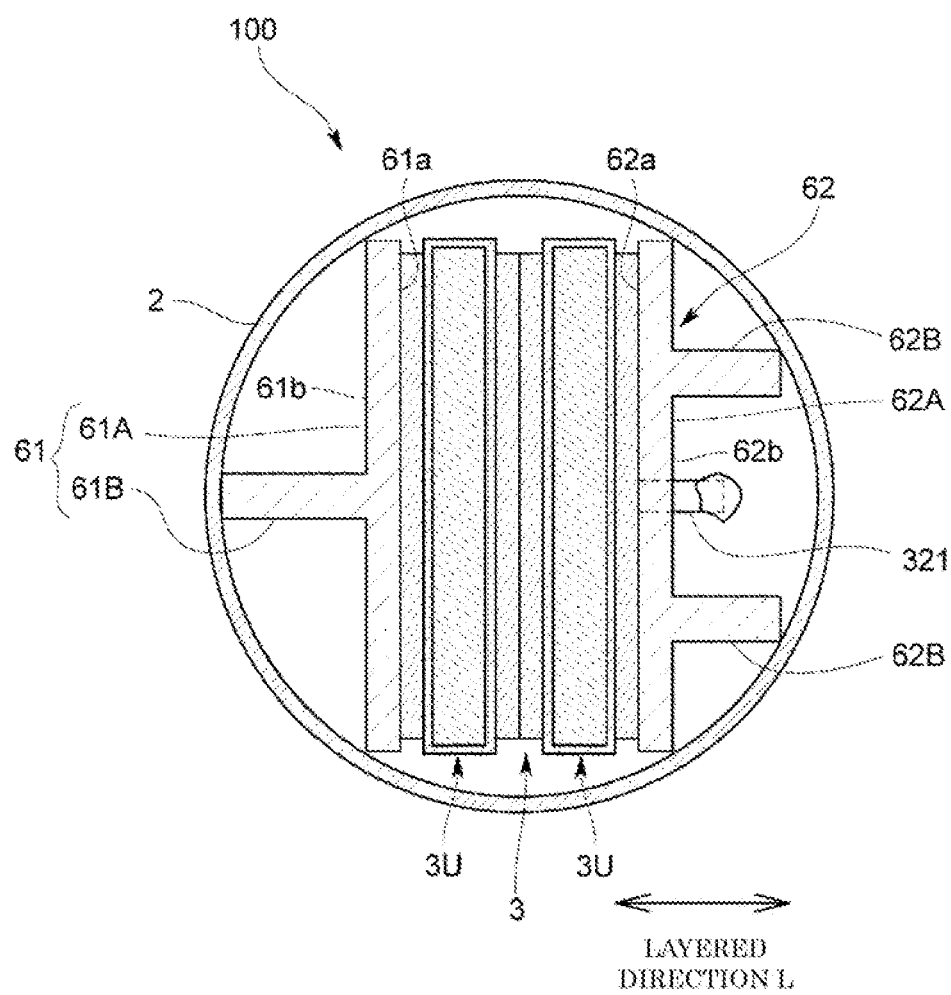
FIG. 26 depicts a transverse sectional view of an alkaline storage battery according to a modification example of the third embodiment.

It is noted that the present invention is not limited to the third embodiment. For example, the paired spacers 61 and 62 according to the foregoing embodiment each have the substantially T shape. Alternatively, as shown in FIG. 26, the number of the case contact portions 61B of the first spacer 61 can be different from the number of the case contact portions 62B of the second spacer 62. FIG. 26 depicts a case where the first spacer 61 has one case contact portion 61B whereas the second spacer 62 has two case contact portions 62B. The case contact portions 62B of the second spacer 62 are located at symmetrical positions in the width direction with respect to the center of the electrode contact portion 62k. The two case contact portions 62B are thus equal to each other in length. The current collecting terminal 321 of the negative electrode plate 32 is located between the two case contact portions 62B in this configuration. It is thus possible to easily determine the position of the current collecting terminal 321 by checking the portion between the two case contact portions 62B.

When the first and second spacers each have a plurality of case contact portions, at least one of the case contact portions of the first spacer and at least one of the case contact portions of the second spacer can extend from different positions, so that these spacers are asymmetrical with each other.

Figure 27:
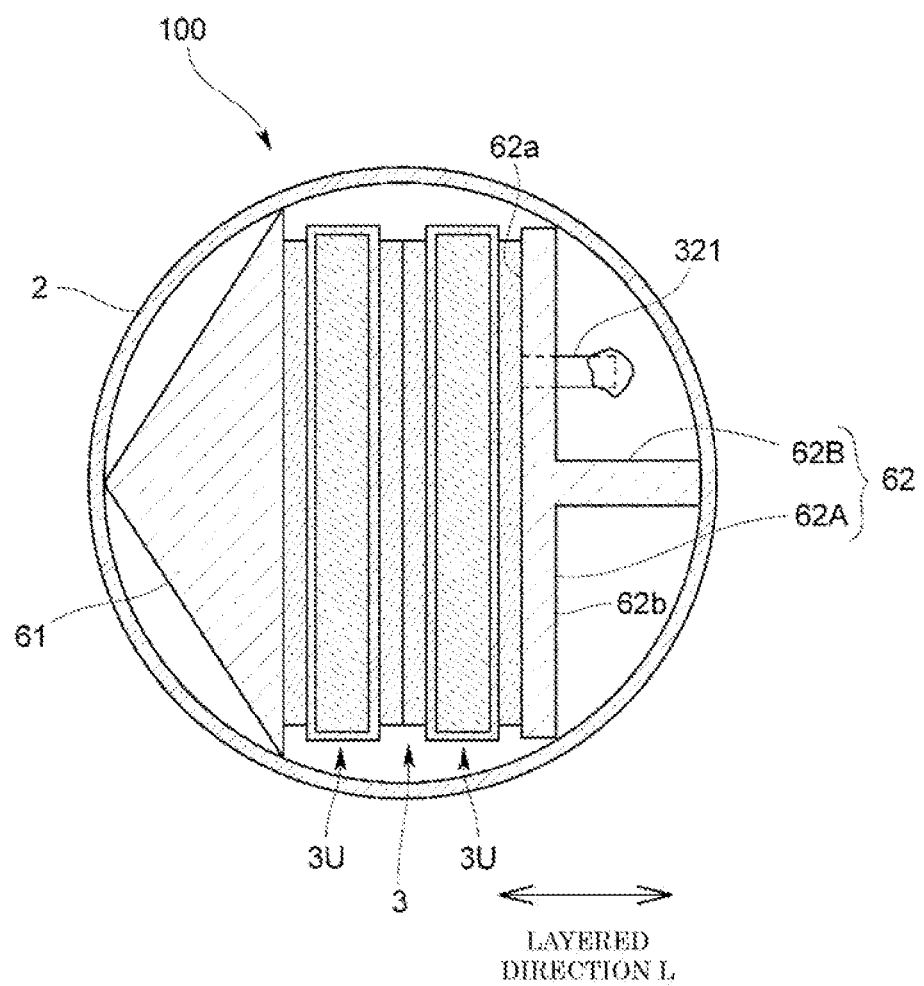
FIG. 27 depicts a transverse sectional view of an alkaline storage battery according to a modification example of the third embodiment.

The first and second spacers 61 and 62 each include the electrode contact portion and the case contact portion in the foregoing embodiment. Alternatively, each of the spacers has only to be shaped so as to fill the space between the electrode group 3 and the inner peripheral surface 2A of the battery case 2. For example, as shown in FIG. 27, at least one of the first and second spacers 61 and 62 can have a triangular prism shape with an isosceles triangle shape in cross section such that a bottom side is in contact with the negative electrode plate. Still alternatively, one of the spacers can have a circular arc shape so as to be in contact with the inner peripheral surface of the battery case in a predetermined peripheral range.

Furthermore, the current collecting terminal is provided to the negative electrode plate in only one of the plurality of (particularly, two) plate units in the foregoing embodiment. Alternatively, the negative electrode plate in each of the plate units can have a current collecting terminal.

The electrode group according to the foregoing embodiment is located in the battery case such that the layered direction is perpendicular to the center axis direction of the battery case. Alternatively, the electrode group can be located such that the layered direction is parallel to the center axis direction of the battery case.

Moreover, the negative electrode plate according to the foregoing embodiment has the substantially U shape. Alternatively, the negative electrode plate can have a flat plate shape. Still alternatively, the positive electrode plate can have a substantially U shape so that the negative electrode plate is sandwiched between the positive electrode plate, or each of the positive electrode plate and the negative electrode plate can have a substantially U shape and these plates are layered such that they fit with each other.

Fourth Embodiment

Described next with reference to the drawings is a cylindrical battery according to a fourth embodiment of the present invention. It is noted that members corresponding to those of the foregoing embodiments are denoted by the same reference signs.

The cylindrical battery 100 according to the fourth embodiment is different from those according to the first to third embodiments in the configurations of the paired spacers 6 (the first spacer 61 and the second spacer 62).

Figure 28:
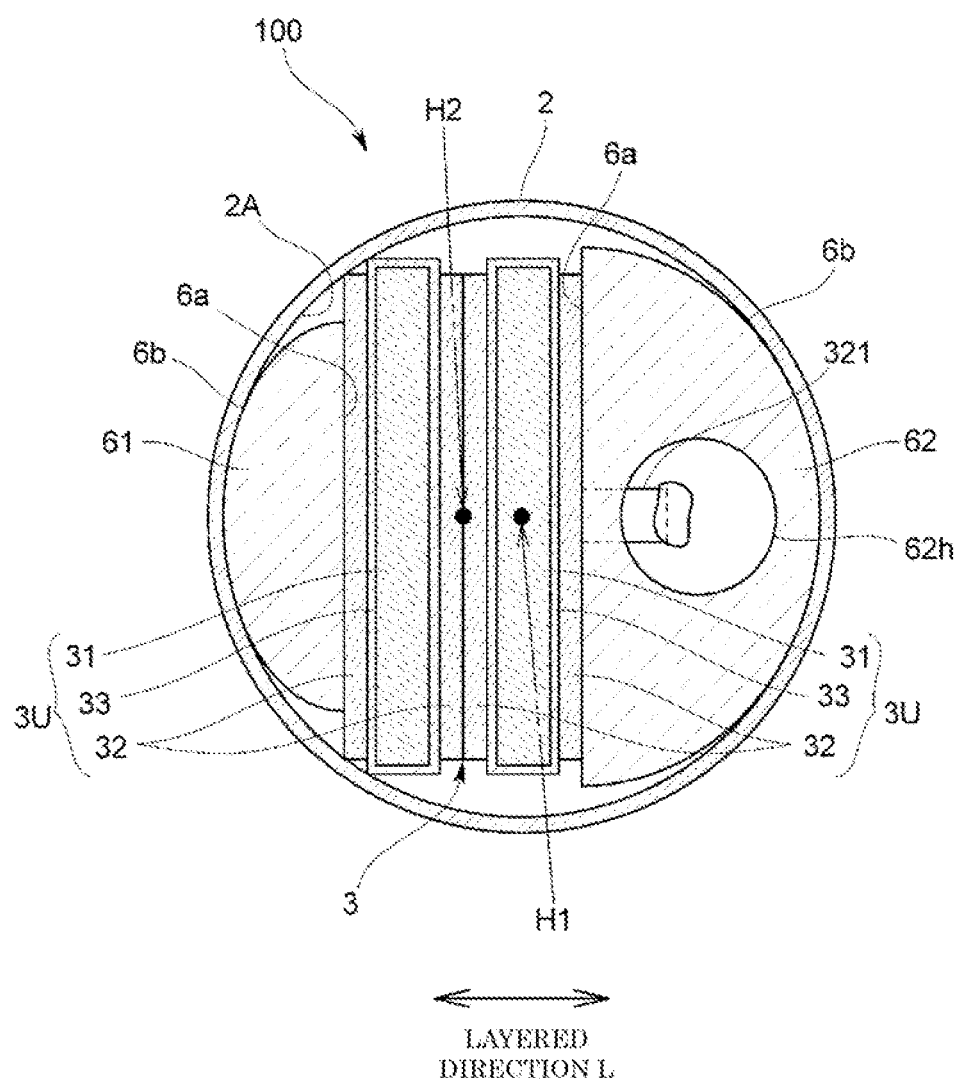
FIG. 28 depicts a transverse sectional view of a cylindrical battery according to a fourth embodiment.

More specifically, the paired spacers 61 and 62 fix the electrode group 3 at a position decentered from a center position H1 of the battery case 2. In other words, as shown in FIG. 28, a center position (center of gravity) H2 in a plan view (when viewed in the center axis direction C) of the electrode group 3 fixed in the battery case 2 is different from the center position H1 of the battery case 2. The center of gravity (not shown) of the entire cylindrical battery 100 is thus different from the center position H1 of the battery case 2.

The paired spacers 61 and 62 are asymmetrical with respect to the electrode group 3 when viewed in the center axis direction C of the battery case 2. Each of the spacers 61 and 62 includes a flat electrode contact surface 6x in contact with the outermost surface of the electrode group 3 in the layered direction L and substantially circular arc case contact surfaces 6y that are provided continuously from the both ends in the width direction of the electrode contact surface 6x and are in contact with the inner peripheral surface 2A of the battery case 2, so as to have a substantially semicircular uniform sectional shape. The case contact surfaces 6y are in contact with the inner peripheral surface 2A of the battery case 2 from the top to the bottom. The case contact surfaces 6Y of the first and second spacers 61 and 62 are in contact with the inner peripheral surface 2A from the top to the bottom, so that the paired spacers 61 and 62 evenly press the entire electrode group 3. This configuration improves the charge-discharge efficiency.

The first and second spacers 61 and 62 are asymmetrical with each other, so that the first and second spacers 61 and 62 have different sectional areas within outlines each surrounded with the electrode contact surface 6x and the case contact surfaces 6y in a cross section perpendicular to the center axis direction C. In the present embodiment, the second spacer 62 has a larger outlined sectional area. The center position H2 of the electrode group 3 is thus decentered from the center position H1 of the battery case 2 toward the first spacer 61.

Furthermore, in the present embodiment, the second spacer 62 having the larger outlined sectional area is formed with a welding hole 62h into which a welding rod used for welding the current collecting terminal 321 of the negative electrode plate 32 to the bottom surface 2B of the battery case 2 is inserted. The welding hole 62h is not particularly limited as long as it has a shape and a size enough to receive the welding rod, and can have a circular shape as shown in FIG. 28, an elliptic shape, a rectangular shape, or the like.

Figure 29:
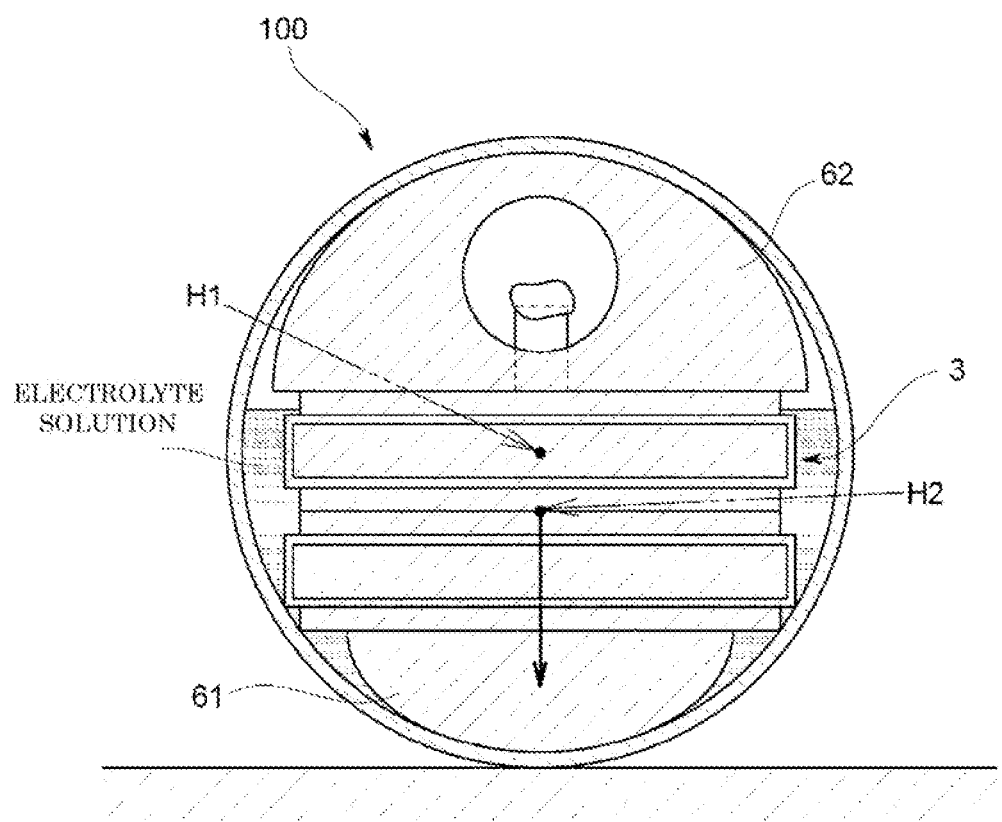
FIG. 29 depicts a schematic view of a state where the cylindrical battery according to the fourth embodiment is laid sideways on a plane.

As shown in FIG. 29, the cylindrical battery 100 is laid sideways at the time of container formation of the cylindrical battery 100. The cylindrical battery 1.00 laid sideways rotates because its center of gravity is decentered from the center position H1 of the battery case 2, and stops in a state where the center position H2 having larger specific gravity of the electrode group 3 is located vertically below the center position H1. This configuration increases the contact area between the electrode group 3 and the electrolyte solution so as to stimulate permeation of the electrolyte solution into the electrode group 3.

Effects of Fourth Embodiment

In the alkaline storage battery 100 according to the fourth embodiment thus configured, the paired spacers 61 and 62 fix the electrode group 3 at the position decentered from the center position H1 of the battery case 2. In the state where the cylindrical battery 100 is laid sideways, the center position H2 having the larger specific gravity of the electrode group 3 is located vertically below the center position H1 of the battery case 2, so that the contact area between the electrolyte solution and the electrode group 3 is increased. This configuration facilitates permeation of the electrolyte solution into the electrode group 3 at the time of container formation.

Modification Examples of Fourth Embodiment

Figure 30:
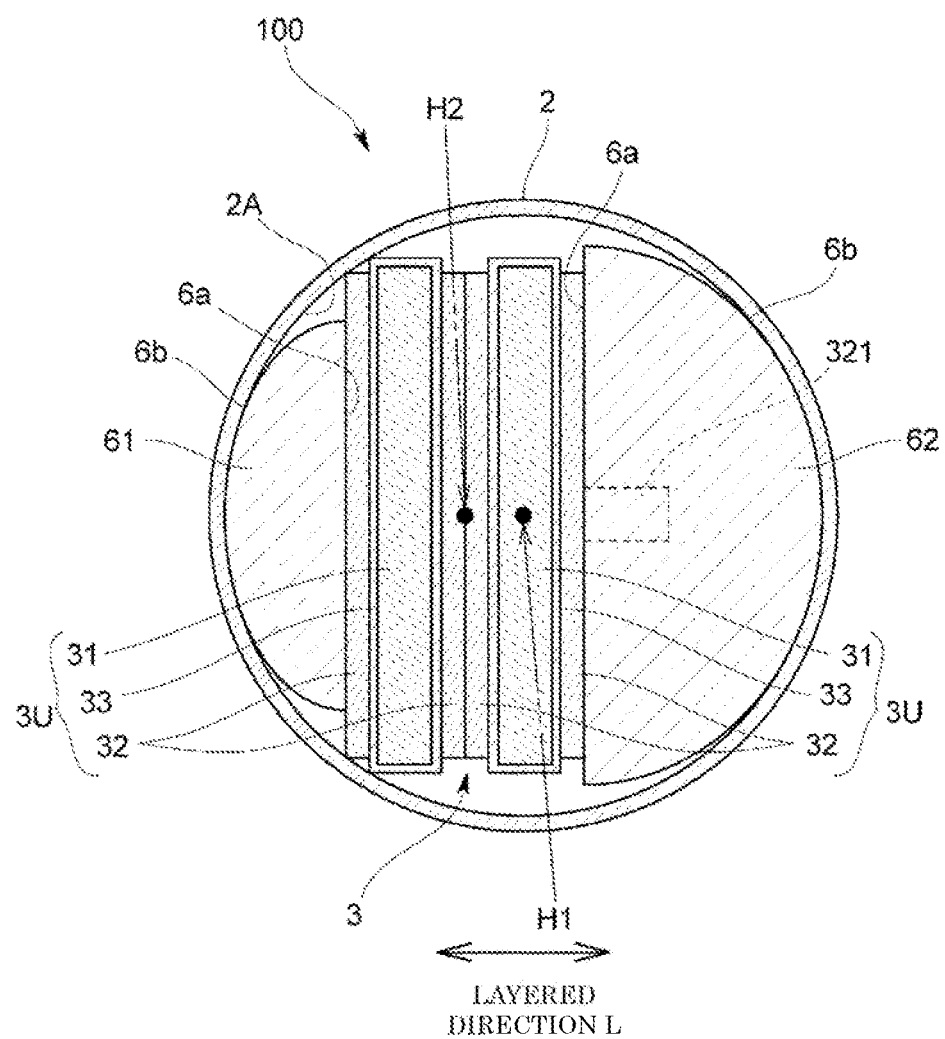
FIG. 30 depicts a transverse sectional view of an alkaline storage battery according to a modification example of the fourth embodiment.

The spacers are not limited in shape to those according to the fourth embodiment. As shown in FIG. 30, the second spacer 62 can be provided with no welding hole 62h. In this case, the current collecting terminal 321 of the negative electrode plate 32 may be welded before the spacers 61 and 62 are located in the battery case 2, or may not be welded but be pressed by the lower surface of the second spacer 62 so as to be in contact with the bottom surface 2B of the battery case 2.

Each of the spacers 61 and 62 according to the fourth embodiment includes the flat electrode contact surface 6x and the circular arc case contact surfaces 6y so as to have the substantially semicircular sectional shape. Each of the spacers 61 and 62 can have any other shape as long as it includes the electrode contact surface 6x and the case contact surface 6y and fixes the electrode group 3 at a position decentered from the center position H1 of the battery case 2.

Figure 31:
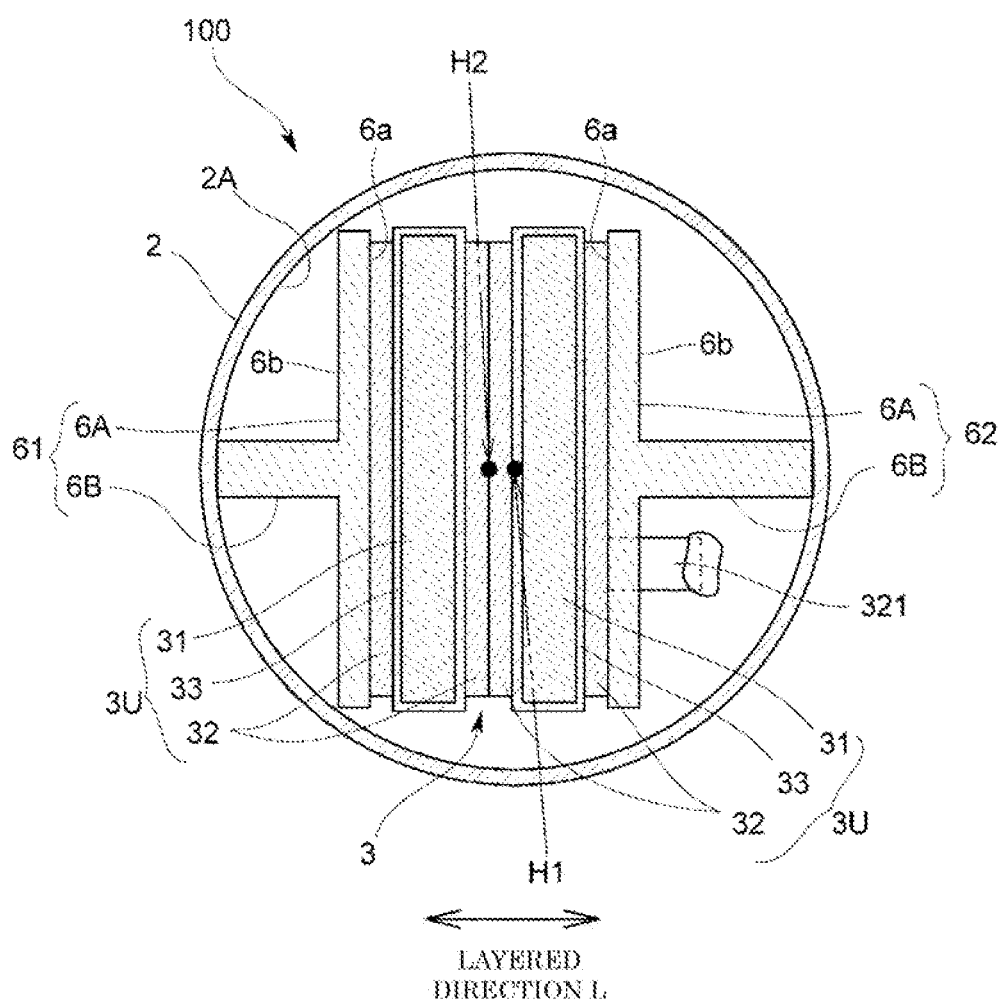
FIG. 31 depicts a transverse sectional view of an alkaline storage battery according to a modification example of the fourth embodiment.

Alternatively, as shown in FIG. 31, each of the spacers 61 and 62 can have the flat electrode contact portion 6A and the case contact portion GB. The electrode contact portion 6A has a first surface 6a serving as a contact surface in substantially entire contact with the outermost surface (more particularly, the outer side surface 32a of the negative electrode plate 32) of the electrode group 3 in the layered direction L. The case contact portion 6B extends from a second surface 6b of the electrode contact portion 6A and is in contact with the inner peripheral surface 2A of the battery case 2. In order to fix the electrode group 3 at a position decentered from the center position H1 of the battery case 2, the case contact portions 6B of the spacers 61 and 62 may be made different in length from each other. In each of the spacers 61 and 62 thus configured, the electrode contact portion 6A and the case contact portion 6B form a concave part therebetween serving as a welding space, which enables the current collecting terminal 321 of the negative electrode plate 32 to be welded to the bottom surface 2B of the battery case 2. The case contact portions 6B of the spacers 61 and 62 are different in length from each other in this configuration. If the current collecting terminal 321 is extended toward the spacer 62 having the longer case contact portion 6B, the position of the current collecting terminal 321 can be easily determined at a glance and the productivity is thus enhanced.

Furthermore, the current collecting terminal is provided to the negative electrode plate in only one of the plurality of (particularly, two) plate units in the fourth embodiment. Alternatively, the negative electrode plate in each of the plate units can have a current collecting terminal.

The present invention is applicable not only to an alkaline storage battery but also to a secondary battery such as a lithium ion secondary battery. Alternatively, the present invention is applicable to a primary battery.

Furthermore, the present invention is not limited to the foregoing embodiments, but can be obviously modified in various manners within the scope of the object thereof. The configurations according to any of the foregoing embodiments can be optionally combined together.

INDUSTRIAL APPLICABILITY

According to the present invention, in a battery including a cylindrical battery case and an electrode group that is smaller than the battery case and is accommodated in the battery case, it is possible to effectively utilize the configurations of the battery case and the electrode group so as to achieve reliable contact between one of electrodes in the electrode group and the battery case.

The invention claimed is:

1. A cylindrical battery, comprising:
   a cylindrical battery case; and
   an electrode group including a positive electrode, a negative electrode, and a separator, the positive electrode, the negative electrode and the separator being layered in a direction perpendicular to a center axis of the cylindrical battery case, wherein
   the electrode group and the battery case define a space communicated from a top to a bottom therebetween,
   one of the positive electrode and the negative electrode has a current collecting terminal that extends from the electrode group in a direction away from the center axis and from an outer side of the electrode group toward a side surface of the cylindrical battery case and that is in contact with a bottom surface of the cylindrical battery case,
   the electrode group has a rectangular parallelepiped shape,
   the one of the positive electrode and the negative electrode is an electrode plate including a current collector,
   the current collector comprises applied portions where an active material is applied, and an unapplied portion that is linearly formed between the applied portions and has no active material applied thereto, and
   the current collector is bent into a substantially U shape when viewed from a direction that is perpendicular to the center axis, the substantially U shape having the applied portions and the unapplied portion, the applied portions extending from both ends of the unapplied portion in the direction parallel to the center axis, the applied portions being perpendicular to the unapplied portion.

2. The cylindrical battery according to claim 1, wherein the current collector is bent at the unapplied portion so that the applied portions at the both ends face each other, and the unapplied portion is partially bent outward to form the current collecting terminal.

3. The cylindrical battery according to claim 2, wherein the unapplied portion is partially formed with a slit and an inside of the slit is bent outward to form the current collecting terminal.

4. The cylindrical battery according to claim 2, wherein the unapplied portion is partially bent outward from one of the applied portions along a bent line on a boundary or a line inside the boundary between the unapplied portion and the applied portion.

5. The cylindrical battery according to claim 2, wherein the bent current collecting terminal and the unapplied portion are located substantially in an identical plane.

6. The cylindrical battery according to claim 2, wherein in at least one of the applied portions at the both ends, the active material applied to an outer surface of the current collector is thinner than the active material applied to an inner surface of the electrode plate of the current collector, the outer surface of the electrode plate of the current collector being opposite to the inner surface of the electrode plate of the current collector.

7. The cylindrical battery according to claim 6, wherein in each of the applied portions at the both ends, the active material applied to the outer surface of the current collector is smaller in amount than the active material applied to the inner surface of the electrode plate of the current collector.

8. The cylindrical battery according to claim 1, wherein the current collecting terminal is welded to the bottom surface of the battery case.

9. The cylindrical battery according to claim 2, wherein the electrode group is accommodated such that the unapplied portion is located close to the bottom surface of the battery case.

10. The cylindrical battery according to claim 1, wherein the current collecting terminal is in contact with the bottom surface and an inner peripheral surface of the battery case.

11. The cylindrical battery according to claim 1, wherein the cylindrical battery has a space communicated from the top to the bottom, and a welding rod used for welding the electrode group to the bottom surface or an inner peripheral surface of the battery case is inserted into the space.

12. The cylindrical battery according to claim 1, further comprising
    at least one spacer fixing the electrode group in the battery case, wherein
    the spacer has the space communicated from the top to the bottom.

13. The cylindrical battery according to claim 12, wherein the at least one spacer includes paired spacers that are provided between an inner peripheral surface of the battery case and the paired outer side surfaces, respectively, and
    the paired spacers are asymmetrical with respect to the electrode group when viewed in a center axis direction of the battery case.

14. The cylindrical battery according to claim 13, wherein one of the positive electrode and the negative electrode in the electrode group has the single current collecting terminal, and the current collecting terminal is welded to the bottom surface of the battery case at one position.

15. The cylindrical battery according to claim 13, wherein each of the spacers includes a flat electrode contact portion having a first surface serving as a contact surface with the electrode group, and a case contact portion extending from a second surface of the electrode contact portion and being in contact with the inner peripheral surface of the battery case, and
    the case contact portions of the spacers extend respectively from the electrode contact portions at positions asymmetrical with respect to the electrode group.

16. The cylindrical battery according to claim 15, wherein each of the case contact portions extends from the electrode contact portion at a position that is away from a center in a width direction of the electrode contact surface.

17. The cylindrical battery according to claim 13, wherein each of the spacers includes a flat electrode contact portion having a first surface serving as a contact surface with the electrode group and at least one case contact portion extending from a second surface of the electrode contact portion and being in contact with the inner peripheral surface of the battery case, and
the number of the case contact portions in one of the spacers is different from the number of the case contact portions in another one of the spacers.

18. The cylindrical battery according to claim 1, further comprising
at least one spacer fixing the electrode group at a position decentered from a center position of the battery case.

19. The cylindrical battery according to claim 18, wherein
the at least one spacer includes paired spacers that are located to sandwich the electrode group, and
the paired spacers are asymmetrical with respect to the electrode group when viewed in a center axis direction of the battery case.

20. The cylindrical battery according to claim 1, wherein
the positive electrode and the negative electrode are layered with the separator being interposed therebetween in the electrode group.

21. The cylindrical battery according to claim 1, further comprising a spacer located in the space, the spacer fixing the electrode group in the battery case.

* * * * *